United States Patent [19]

Raducanu

[11] Patent Number: 4,484,123
[45] Date of Patent: Nov. 20, 1984

[54] METHOD AND APPARATUS FOR CONTROLLING AND REGULATING A MOTOR WITH A PERMANENT MAGNETIC ROTOR

[75] Inventor: Dan-Corneliu Raducanu, Bad Soden, Fed. Rep. of Germany

[73] Assignee: Braun Aktiengesellschaft, Kronberg, Fed. Rep. of Germany

[21] Appl. No.: 213,769

[22] Filed: Dec. 8, 1980

[30] Foreign Application Priority Data

Dec. 12, 1979 [DE] Fed. Rep. of Germany ....... 2949947

[51] Int. Cl.$^3$ ............................................. H02K 29/04
[52] U.S. Cl. .................................. 318/696; 318/685; 368/157
[58] Field of Search ............... 318/138, 254, 685, 696; 368/217, 157

[56] References Cited

U.S. PATENT DOCUMENTS 3,611,081 10/1971 Watson ................................ 318/138
4,250,544 2/1981 Alley ................................. 318/696 X

OTHER PUBLICATIONS

Glaser, G., The Technology of Quartz Watches, Wilhelm Kempter KG 1979, pp. 142–161.

Primary Examiner—J. V. Truhe
Assistant Examiner—Saul M. Bergmann
Attorney, Agent, or Firm—Robert A. Shack

[57] ABSTRACT

A method and an apparatus for controlling and regulating an electrical motor, especially a reactive motor for time-keeping devices such as clocks. The motor has a permanent-magnetic rotor with at least two poles, and a stator with at least two coils. In a normal speed mode one of coils is supplied with driving pulses whereas the second coil senses the rotational speed of the rotor. If the rotational speed of the rotor falls below a predetermined value, a self-starting mode is initiated wherein the first and second coils are alternately supplied with driving pulses. In this self-starting mode the frequency of the pulses supplied to the first and second coils is increased until normal speed has been reached wherein the self-starting mode is switched off and the normal speed mode regulation is switched on.

12 Claims, 14 Drawing Figures

METHOD AND APPARATUS FOR CONTROLLING AND REGULATING A MOTOR WITH A PERMANENT MAGNETIC ROTOR

CROSS-REFERENCES TO RELATED APPLICATIONS

The subject matter of a commonly-assigned application Ser. No. 213,785 filed Dec. 8, 1980 by Harald Hoffmann and Dan-Corneliu Raducanu is disclosed, but not claimed herein.

BACKGROUND OF THE INVENTION

The invention concerns a process and an arrangement for controlling and regulating a motor with a permanent-magnet rotor with at least one pole pair and one stator with two or more coils. At least one of these coils has driving pulses applied to it. It especially concerns reaction motors of time-keeping devices like watches.

Low-frequency electromagnetically excited stepping switch mechanisms, excited or synchronized oscillating systems, stepping switching motors, and synchronous motors are used as electromechanical converters for timekeeping devices like quartz watches, to transmit the divided quartz frequency to an indicator device. The synchronous motors are driven with the exciter frequency either in a self-starting or in a non-self-starting manner. Such reactive synchronous motors generally have a field coil to which is applied an alternating voltage that is synchronous with the magnetic field generated by the rotational motion of the rotor. Self-starting synchronous motors have the disadvantage of high power consumption. with battery operation, this leads either to frequent battery changes or to a very large battery. Both are undesirable, especially for watches. Besides the disadvantage of high power consumption, self-starting synchronous motors have the further disadvantage that a pulse that has been lost by a pole jump can no longer be recovered. Such a system cannot keep constant the number of revolutions in a given time interval. Non-self-starting motors can no longer start by themselves after a stoppage during operation, but they must be started anew by mechanically cranking the rotor. In addition, in the case of synchronous motors which must be cranked, one must take care that the pointer can be adjusted precisely.

In rotating stepping switching mechanisms (stepping motors), one utilizes the motion of a permanent magnet rotor with n pole pairs in a stator field that is excited through alternating or rectified current pulses by respectively one half or one pole pair step. Stepping switching motors with permanent-magnet rotors have relatively large torque and a high efficiency, due to the high magnetic field, and permit a larger step angle with favorable damping of the step motor. A review of the known solutions can be found in the reference by G. Glaser: "Quartz watch technology" (Wilhelm Kempter KG Publishers, 1979, pages 142–161).

The aim of the present invention is to specify a control and regulation method, as well as an arrangement, according to which a reactive motor with a permanent-magnet rotor will again start up by itself following a stoppage during operation and will, during normal operation, react to a counter-rotational force with an appropriate increase of driving power. At the same time, it will make do with the smallest possible power consumption. Even if the supply voltage has dropped considerably, perfect operation will be assured. Here, the regulation operates with negligible dead time.

According to the invention this aim is achieved by a process which is specified by the features listed in the characteristic part of claim 1.

More extensive features of the inventive control and regulation process are contained in the characteristic parts of claims 2 through 8. An arrangement to perform the inventive control and regulation process is characterized by the features of claim 9.

Further favorable developments of the invention can be taken from claims 10 through 22.

The inventive solution assures self-starting of the motor in a single direction after the motor has stopped or after a considerably reduced rotational speed due to a strong torque at the shaft of the rotor, by switching from nominal running operation to self-starting operation with one or more prescribable frequencies. In normal operation, it guarantees the perfect regulation of the rotational speed of the motor with negligible dead time after the appearance of a counter-torque. Here, the power consumption of the motor in normal operation is exceedingly small and perfect functioning is assured even with a strongly reduced supply voltage. The solution is therefore universally applicable with watches having a small or a large counter-torque, i.e. for small wristwatches or table clocks up to large wall clocks.

The idea on which the invention is based will be explained in more detail by means of the embodiments of the subject of the invention which are shown in the drawings.

Figure 1:
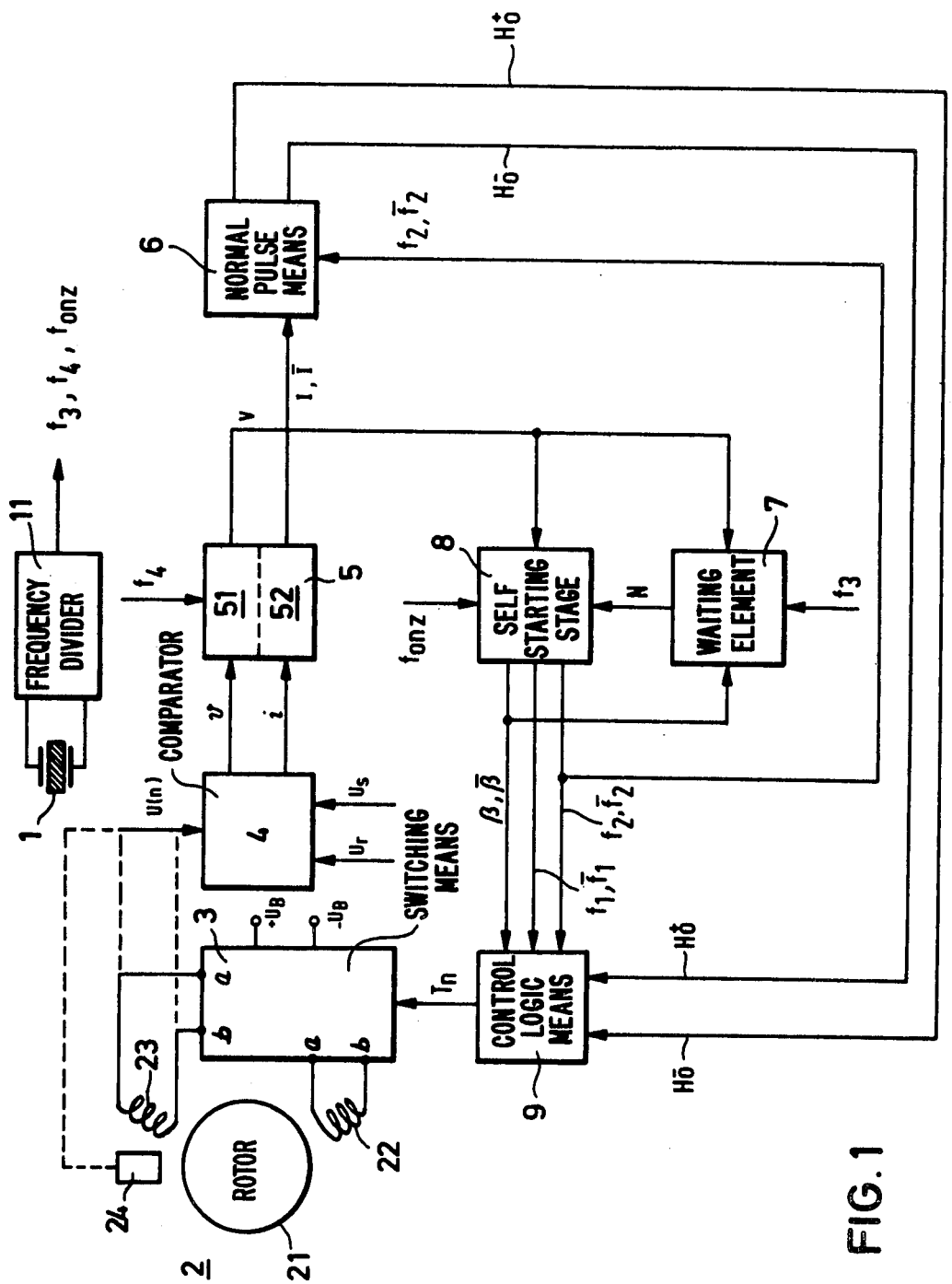
FIG. 1 shows the schematic representation of a reactive motor with the total control and regulation arrangement.

FIG. 1 schematically shows a reactive motor 2 which has a rotor 21 with poles formed by permanent magnets and a stator, not shown in more detail, having two coils 22, 23. If one of the two coils 22, 23 has pulses applied to it, the rotor 21 can be brought to a rotational speed corresponding to the pole-pair number and the frequency. The revolutions of the rotor 21 are transmitted via a shaft and a transmission to an indicator system for use in time-keeping devices such as clocks. For example, this makes possible an analog indication by means of several pointers and a number dial.

To sense the rotational speed n and to emit a voltage $U_n$ proportional to the rotational speed in order to control the rpm in normal operation, or as a criterion to initiate self-starting operation, a device 24 has been provided which can consist, for example, of an opto-electronic, magnetic or equivalent device. However, the second coil 23 of the stator can also very simply be used as a sensor coil, since it, just like the first coil 22, lies within the range of influence of the magnetic lines of the poles of the rotor 21. When the rotor 21 rotates, the magnetic field lines of the pole periodically cut the second coil 23. As a result, a sinusoidal voltage $U_n$, proportional to the rotational speed n of the rotor 21, will be present at the ends of the coil. The voltage $U_n$ will have zero crossings, and represents the so-called sensor signal. This voltage $U_n$, proportional to the rotational speed, together with two comparison voltages $U_r$, $U_s$, is applied to the inputs of a comparator element 4. Here, the sensor signal is converted into two rectangular pulses for the rpm regulation or for initiating start up operation. The vertical edges of these pulses lie at the intersections with the constant comparison voltages $U_r$, $U_s$. The essentially rectangular output signals V, I of the comparator 4 are applied to the inputs of a noise-suppression and delay element 5, which is constructed of two component stages 51, 52, and which additionally has applied to it a pulse frequency $f_4$. This noise-suppression and delay element 5 emits actual-value frequency pulses I, $\bar{I}$ for nominal operation to a regulation device for the nominal operation 6 and it emits self-starting signals V to a subsequent self-starting stage 8 for the likewise required initiation of self-starting operation.

The regulation device for nominal operation 6 has applied to it not only the actual-value frequency pulses I, $\bar{I}$, but also the design-value frequency pulses $f_2$, $\bar{f_2}$ which are emitted by the self-starting stage 8. At the output, two different nominal running pulses Ho$^+$, Ho$^-$ are emitted.

Not only the self-starting signal V but also one more mutually different frequency signal $f_{onz}$ as well as a prescribable signal N are inputted to the self-starting stage 8. The prescribable signal N is generated in a waiting time element 7, which consists of one or more delay stages TR 1 through TR 3. A frequency signal $f_3$ is inputted at the first delay stage TR 1, while the reset inputs of all the delay stages are synchronously reset in dependence on the self-starting signal V and the switch-over signal $\beta$.

From the self-starting stage 8, not only the switching signals $\beta$, $\bar{\beta}$ but also two pulse sequences $f_1$, $\bar{f_1}$, as well as $f_2$, $\bar{f_2}$, together with the nominal running pulses Ho$^+$, Ho$^-$, which are emitted for the regulation device for nominal operation 6, are conducted to a subsequent driving logic circuit 9, at whose outputs (appear) pulse sequences $T_n$ to drive the switches of a subsequent switching stage 3, which is connected both with a voltage source +$U_B$, −$U_B$ and with the coils 22, 23 of the reactive motor 2. Here, the switching stage 3 connects the coils 22, 23 of the reactive motor 2 with one or the other pole of the voltage source +$U_B$, −$U_B$.

The generator is associated with the entire arrangement, which has a piezoelectro quartz 1 and a frequency divider 11, at which there exists rectangular pulse frequencies $f_3$, $f_4$ and $f_{onz}$, which are conducted to the appropriate part of the arrangement at the above-mentioned points.

Figure 2:
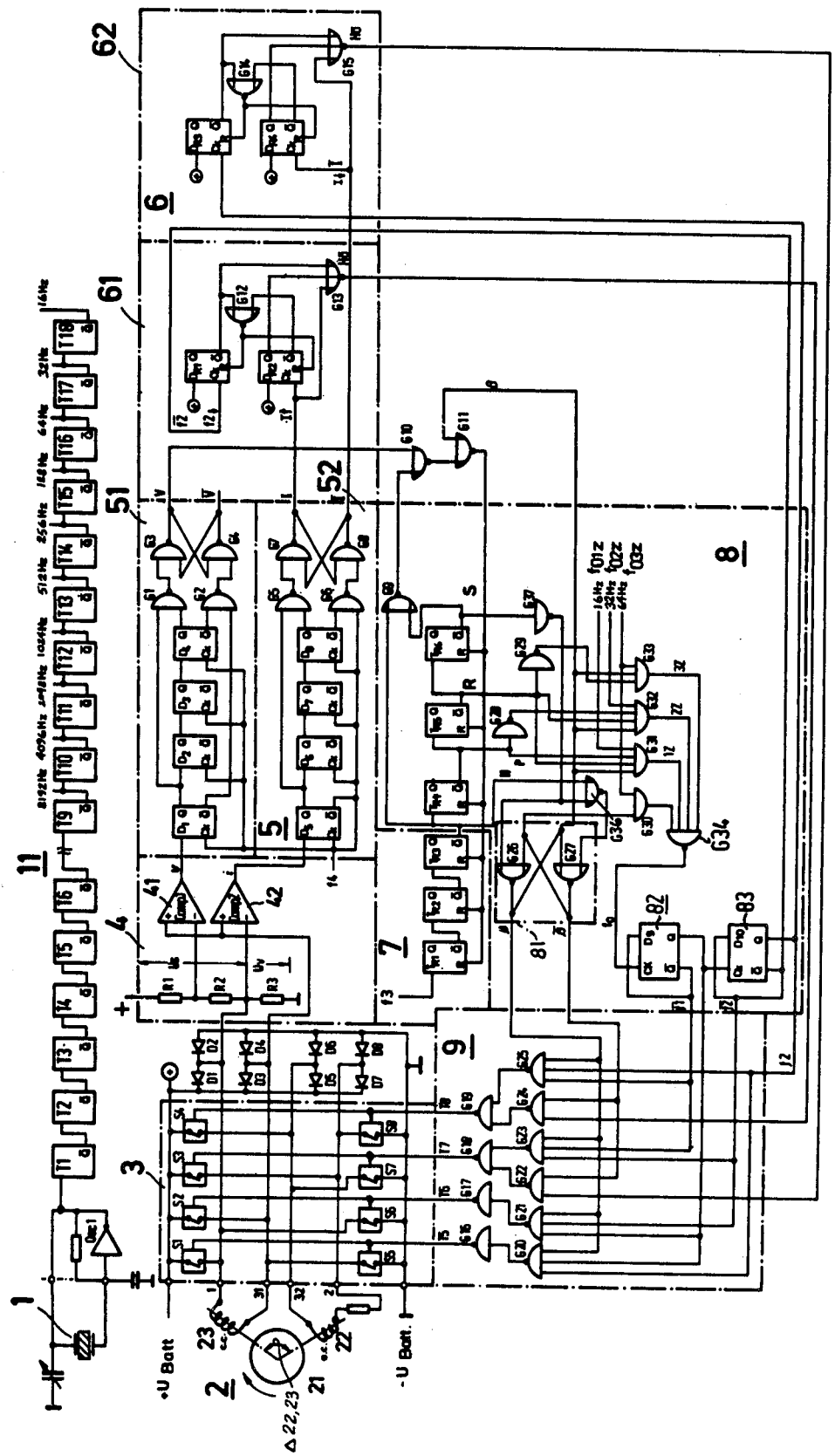
FIG. 2 shows a detailed representation of the individual control and regulation circuit elements.

The detailed representation of the control and regulation circuit arrangement, which is shown in FIG. 2, shows, within its dot-and-dash frame, the elements shown in FIG. 1.

The comparator element contains two comparators 41 and 42, whose positive inputs are connected to one end of the second coil 23. While the negative input of the first comparator 41 is connected to one reference voltage $U_s$, the negative input of the second comparator 42 is connected to the other reference voltage $U_r$, and to the other coil end of the second coil 23. The outputs of the comparators 41, 42 with the signals V and I are separately conducted to one of the two component stages 51 and 52 of the noise-suppression and delay stage 5. Each of the two component stages 51, 52 contains four series-connected pulsed flip-flops D 1 through D 4 and respectively D 5 through D 8, whose pulse inputs $C_k$ are synchronously charged with a prescribable frequency $f_4$, in this case a frequency of 1024 Hz. The input of the respectively first pulsed flip-flop D 1 or D5 is connected with the output of the first or second comparator 41 or 42, respectively. The outputs Q of the pulsed flip-flops D 1 through D 3 or respectively D 5 through D 7 are always connected with the input of the subsequent pulsed flip-flops D 2 through D 4 or respectively D 6 through D 8. The output of the respectively last flip-flop D 4 or D 8 is connected to one input of a subsequent first NAND gate G 1 or G 5 respectively, to whose other input is connected the output of the respectively first pulsed flip-flop D 1 or D 5. The negated outputs $\bar{Q}$ of the first or respectively last pulsed flip-flop D 1 or respectively D 4 and D 5 or respectively D 8 are connected to the inputs of the second NAND gate G 2 or respectively G 6.

The outputs of these first two NAND gates G 1, G 2 or respectively G 5, G 6 are applied to the input of a third or respectively fourth NAND gate G 3, G 4 or respectively G 7, G 8, whose other input is always connected with the output of the respectively other NAND gate G 4, G 3 or respectively G 8, G 7. The output signal V from the first noise-suppression and delay stage 51, which is identical to the output signal of the third NAND gate G 3, is connected to the input of the subsequent self-starting stage 8. The output signals I, $\bar{I}$ of the second noise-suppression and delay stage 53, which are identical to the output signals of the third and fourth NAND gate G 7, G 8 of this stage, are connected to the subsequent regulation device for nominal operation 6.

The regulation device for nominal operation 6 likewise has two separate regulation devices 61 and 62 for the nominal running pulses Ho$^+$, Ho$^-$. Each of these regulation devices 61, 62 contains two D-flip-flops $D_{R1}$, $D_{R2}$ or respectively $D_{R3}$, $D_{R4}$, two NOR gates G 12, G 13, or respectively G 14, G 15, which are linked together in such a fashion that the negated ouputs $\bar{Q}$ of the two D-flip-flops $D_{R1}$, $D_{R2}$ and $D_{R3}$, $D_{R4}$ are connected together through the first NOR gate G 12 or respectively G 14, and are applied to the reset inputs of the two D-flip-flops $D_{R1}$, $D_{R2}$ and $D_{R3}$, $D_{R4}$. The negated output $\bar{Q}$ of the first D-flip-flop $D_{R1}$ or respectively $D_{R3}$ and the output of the second D-flip-flop $D_{R2}$ or respectively $D_{R4}$, together with the output signals I, $\bar{I}$ of the first noise-suppression and delay stage 52, are connected to the three inputs of the second NOR gate G 13 or respectively G 15. The outputs of these two NOR gates G 13 or respectively G 15 are connected to the two inputs of the driving logic circuit 9. The inputs of the four D-flip-flops $D_{R1}$–$D_{R4}$ are connected to positive potential, while the pulse inputs $C_k$ of the respectively first D-flip-flop $D_{R1}$ or respectively $D_{R3}$ have applied to them the falling or respectively rising edge of a frequency $f_2$ or respectively $\bar{f_2}$ which is given by the self-starting stage 8. The pulse input $C_k$ of the respectively second D-flip-flop $D_{R3}$ or $D_{R4}$ has applied to it the rising or respectively falling edge I, $\bar{I}$ of the pulses which are present at the output of the second noise-suppression and delay stage 52.

The self-starting stage 8 contains the series circuit of three T-flip-flops $T_{R4}$, $T_{R5}$, and $T_{R6}$, whose negated outputs $\bar{Q}$ emit the signals P, R, S and are switched to the input of the respectively subsequent T-flip-flop $T_{R4}$, $T_{R5}$, and $T_{R6}$. The input of the first T-flip-flop $T_{R4}$ is connected to the output of the waiting time element 7, which emits the signal N. The reset inputs R of the three T-flip-flops $T_{R4}$ through $T_{R6}$ are jointly connected to the output of a circuit which consists of three NOR gates G 9 through G 11. The inputs of the first NOR gate G 9 have applied to them both the negated output $\overline{Q}$ of the third T-flip-flop $T_{R6}$ and the prescribable signal N which is emitted by the waiting time element 7. One input of the second NOR gate G 10 is connected to the output of the first NOR gate G 9, while the second input has applied to it the self-starting signal V emitted by the first noise-suppression and delay stage 51.

delay stages TR 1 and TR 2 are connected to the inputs of the subsequent delay stage, and the signal N is present at the output of the third delay stage TR 3.

The output signals $\beta$, $\overline{\beta}$, $f_1$, $\overline{f}_1$, $f_2$, $\overline{f}_2$ of the self-starting stage 8 and the output signals Ho⁻ as well as Ho⁺ of the regulation device for nominal operation 6 are connected together in the subsequent control logic circuit 9 by means of the six AND gates G 20 to G 25—whose outputs are connected to the four further AND gates G 16 to G 19—in such a fashion that they satisfy the following truth table:

| Operation | Signal | | | | | | | Switches | | | |
|---|---|---|---|---|---|---|---|---|---|---|---|
| | $\beta$ | $T_5$ | $T_6$ | $T_7$ | $T_8$ | $H\overset{+}{o}$ | $H\overset{-}{o}$ | S1/S5 | S2/S6 | S3/S7 | S4/S8 |
| Self- | | H | H | L | L | L | — | — | E | A | A | A |
| starting | | H | L | L | L | H | — | — | A | A | A | E |
| | | H | L | H | L | L | — | — | A | E | A | A |
| | | H | L | L | H | L | — | — | A | A | E | A |
| Nominal | $H\overset{+}{o}$ | L | L | L | H | L | H | L | A | A | E | A |
| running | $H\overset{-}{o}$ | L | L | L | L | H | L | H | A | A | A | E |
| operation | $H\overset{+}{o} = H\overset{-}{o}$ | L | L | L | L | L | L | L | A | A | A | A |

The third NOR gate G 11 is connected to the output of the second NOR gate G 10 and also has applied to it the switchover signal $\beta$ that is emitted by the self-starting stage 8. Furthermore, four AND gates G 30 through G 33 are provided in the self-starting stage 8. Their inputs have applied to them the prescribed frequency signal $f_{o1z}$, $f_{o2z}$, $f_{o3z}$, in the embodiment 16, 32, 64 Hz, the output signals P and R, as well as the output signals $\overline{T}$, $\overline{R}$ which have been negated by means of two NOR gates G 28, G 29, and which come from the first and second T-flip-flops $T_{R4}$ and $T_{R5}$, the switchover signal $\beta$, as well as the negated switchover signal $\overline{\beta}$, in the following fashion:
first gate G 30: $\overline{\beta}$ (negated) and $f_{o3z}$ (64 Hz)
Second gate G 31: $\beta$, P, R, and $f_{o1z}$ (16 Hz)
Third gate G 32: $\beta$, $\overline{P}$, R, and $f_{o2z}$ (32 Hz)
Fourth gate G 33: $\beta$, $\overline{R}$, and $f_{o3z}$ (64 Hz)

The outputs of the four AND gates G 30 through G 33 are collected together through a NOR gate G 34, at whose output is present the pulse sequence $f_o$, which is applied to the pulse input $C_k$ of a subsequent D-flip-flop 82. The D-flip-flop 82, together with a second D-flip-flop 83, forms a frequency divider stage. With both D-flip-flops 82, 83, the negated output $\overline{Q}$ is connected with the input $D_9$ and $D_{10}$ respectively. The output Q of the first D-flip-flop 82 is connected to the pulse input of the second D-flip-flop 83. The divided frequency sequences $f_1$, $\overline{f}_1$ as well as $f_2$, $\overline{f}_2$, are present at the output Q and the negated outputs $\overline{Q}$ of the two D-flip-flops 82 and 83. The negated output signal $\overline{S}$ from the third T-flip-flop $T_{R6}$ and the output signal of another NOR gate 36 are applied to the input of another flip-flop 81 of the self-starting stage 8. The negated output signal $\overline{S}$ and the signal N which is emitted by the waiting time element are collected together at the NOR gate 36. The switchover signal $\overline{\beta}$ as well as the negated switchover signal $\beta$ are present at the output of the flip-flop 81, which, in the embodiment, is composed of two NOR gates G 26 and G 27.

In the embodiment, the waiting time element 7 consists of three delay stages TR 1 through TR 3, whose reset inputs R, together with the reset inputs of the T-flip-flops of the self-starting stage 8, are connected to the output of the gate G 11. A frequency $f_3$, in the embodiment 16 Hz, is applied to the input of the first delay stage TR 1, while the outputs $\overline{Q}$ of the first and second where
H = high potential
L = low potential
— = insignificant condition
E = switch closed
A = switch open The outputs T 5 through T 8 of the NAND gates G 16 through G 19 are used to drive the eight switches S 1–S 8 of a switching stage 3, whose switching connections are connected in cyclic permutation respectively to the positive or negative battery connection $+U_{BAT}$ and $-U_{BAT}$, as well as to one or the other end of the first or second coil 22 or 23 of the reactive motor 2. Here, one output signal T 5–T 8 always drives two switches, which are connected to one or the other battery pole and to one or the other end of the two coils 22 and 23. The diodes D 1–D 8 are situated in the switching stage and are connected in parallel to the coils 22 and 23 in such a fashion that the magnetic energy stored in the coils, after switching off the switches S 1 through S 8, can be delivered back to the supply battery.

The revolutions of the motor rotor 21 are transmitted through a shaft (not shown in more detail) to a transmission and from there, through a further shaft, to an indicator system which, for example, makes possible an analog display by means of several pointers and a number dial.

Figure 3:
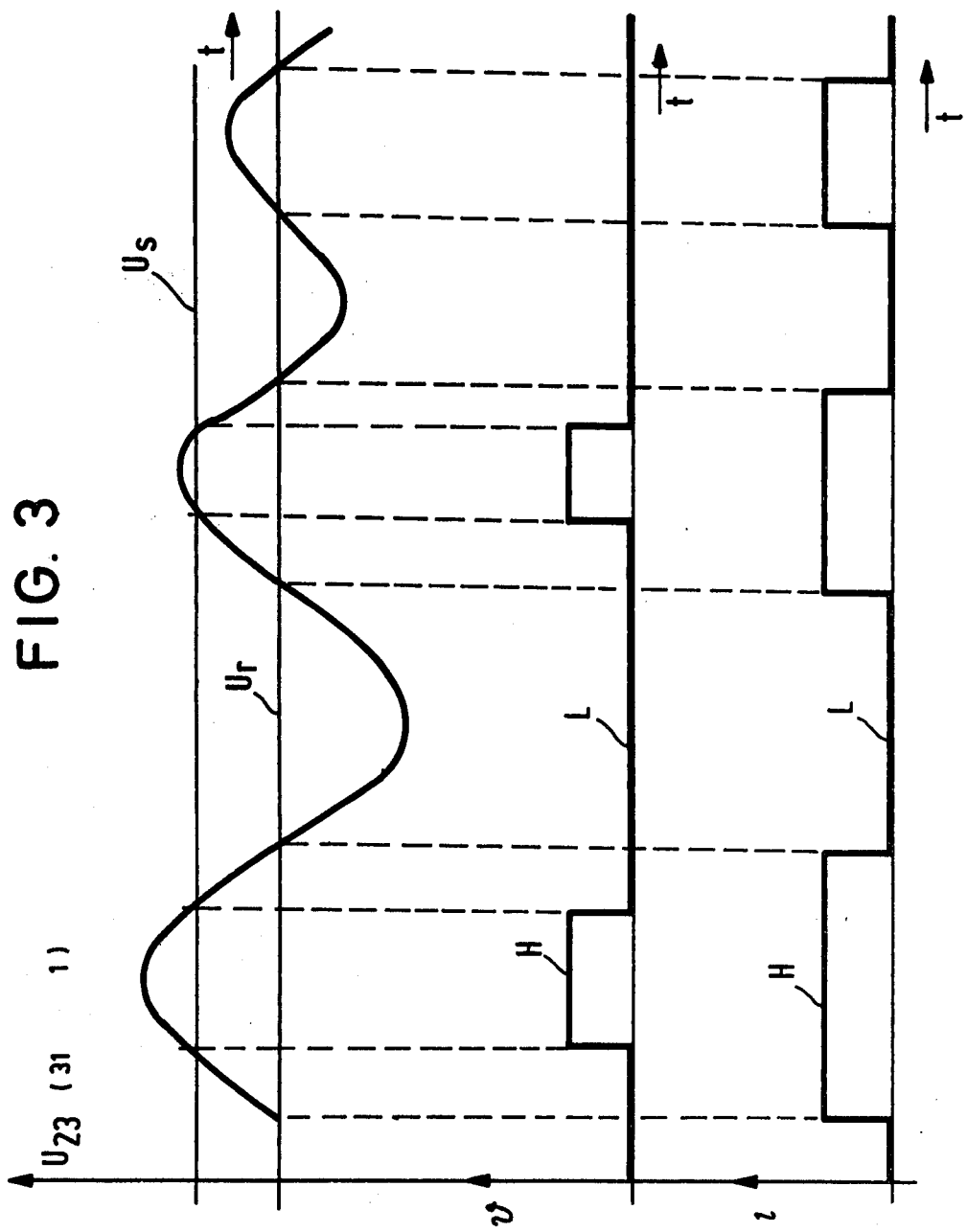
FIGS. 3, 4, 5 show time representations of the pulses and signals according to FIGS. 1 and 2.

The mode of operation of the inventive process and the inventive arrangement will subsequently become apparent from the time displays of the individual signals in FIGS. 3 and 4. FIG. 3 shows the time pattern of the voltages at the second coil 23, the constant reference voltages $U_r$ and $U_s$, as well as the output signals v and i from the two comparators 41 and 42. When the rotor 21 rotates, magnetic lines of the poles N and S periodically cut the magnetic field lines of the second working coil 23, which generates a sinusoidal voltage $U_W$ with zero crossings, the so-called sensor signal. By comparison with the reference voltages $U_r$ and $U_s$ in the two comparators 41 and 42, which can also be called pulse shapers, the sensor signal is converted into rectangular pulses, whose vertical edges lie at the intersection points of the sensor signal with the reference voltages $U_r$ and $U_s$.

In the regions where the sensor signal $U_W$ is greater than the respective reference voltage $U_r$ or $U_s$, a rectangular signal v or respectively i is emitted. The comparators 41 and 42 digitalize this sensor signal, therefore, so that the output signals v and i at the output of the two comparators 41 and 42 look as is shown in FIG. 3. The signal v is H (for high potential) only if the sensor signal $U_W$ is greater than the reference voltage $U_S$. In this way, for example, it is possible to communicate the fact that the rotor rotational speed falls below an rpm corresponding to the reference voltage $U_S$. This reference voltage is also used, however, for an increased signal to noise ratio, so that possible interferences in the second coil 23, which are smaller than the reference voltage $U_S$, will not appear in the output signal v at the output of the first comparator 41. The digitalized output signals v and i from the comparators 41 and 42 are applied to the inputs of the subsequent noise-suppression and delay stages 51 and 52, which work on the basis of a time delay. Only for conditions (L) and (H) which last longer than a time interval $\Delta t$, will a change in the signal appear after the appropriate noise-suppression and delay stage 51 or 52 respectively (V or I), so that noise pulse peaks in the form L-H-L or H-L-H in the output signals v and i, which are shorter than the abovementioned time interval $\Delta t$, will not be transmitted by the respective noise-suppression and delay element 51 or 52. The noise-suppression and delay elements 51 and 52 simultaneously act as a delay element between the signals v and V and respectively i and I.

The delay between the input signals v and i of the noise-suppression and delay stages 51, 52 and the output signals V and I or respectively $\bar{I}$ offers advantages in optimizing the control pulse setting with respect to the first coil 22 as well as for nominal running operation.

Figure 4:
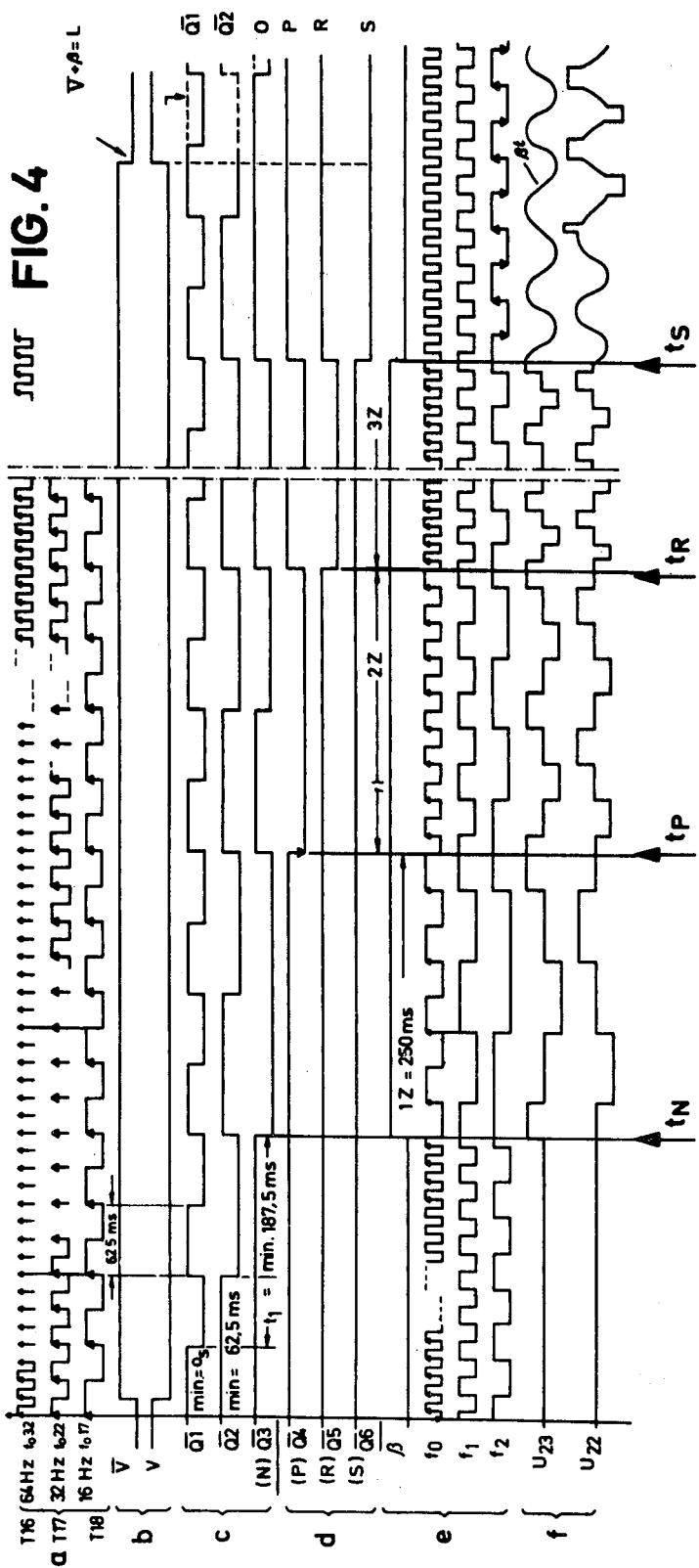

FIG. 4, from top to bottom, shows the following signals:

(a) Three frequency signals $f_{o1z}$ through $f_{o3z}$, which are tapped at various points of the frequency divider chain 11, that is connected after the quartz oscillator 1

(b) The signals $\bar{V}$ and respectively the signal V which is used as the reset signal for the self-starting stage 8, which are present at the output of the first noise-suppression and delay stage 51.

(c) The signals $Q\bar{1}$ through $Q\bar{3}$, which are present at the output of the T-flip-flops of the waiting time element 7, where the output signal $Q\bar{3}$ of the third T-flip-flop corresponds to the signal N.

(d) The output signals P, R, S of the three T-flip-flops of the self-starting stage 8

(e) The switchover signal $\bar{\beta}$ for initiating self-starting operation, the signal $f_o$ emitted by the NOR gate G 34 of the self-starting stage 8, as well as the signals $f_1$ and $f_2$ emitted by the self-starting stage.

(f) The signals $U_{w1}$ and $U_{w2}$ at the coils 22 and 23 of the motor 2.

From this time representation of the individual signals, in connection with the circuit arrangement according to FIG. 2, one can derive the following mode of functioning:

If the rotational speed of the rotor 21 of the motor 2 falls below a certain limit, so that the output signal V of the first noise-suppression and delay stage 51 no longer remains H (for a high potential) over a certain time interval, the joint reset input R of the T-flip-flops TR 1 through TR 6 of the waiting time element and of the self-starting stage 8 will remain at L (for low potential) during this time interval. It is here presupposed that the switchover signal $\beta$, during normal operation, was L from the preceding state and at least one of the two input signals N or S of the respectively third T-flip-flop TR 3 or TR 6 of the waiting time element 7 or of the self-starting stage 8 was H. If the signal V remains in state L during a time interval $t_1$, for example because the rotor 21 of the motor 2 is no longer moving, the output N of the third T-flip-flop TR 3 of the waiting element 7 is set into the state L and on its part sets the flip-flop 81, so that the switchover signal $\beta$ is set to the state H and the negated switchover signal $\bar{\beta}$ is set to the state L. After $\beta$ has become H, and as long as the switchover signal remains in this state, a setting of the T-flip-flops TR 1 through TR 6 to zero is prevented, since the output of the NOR gate 11, i.e. the reset signal for the T-flip-flops TR 1 through TR 6, remains in the state L because $\beta$=H. As long as the switchover signal $\beta$ remains in the state H, self-starting operation will continue according to the principle of a stepping motor with two coils. During this time, the frequency signal $f_o$, emitted by the NOR gate G 34 in the self-starting stage 8, will assume different values depending on the instant within the range where the switchover signal $\beta$=H. The various ranges 1Z, 2Z, and 3Z are generated by means of the T-flip-flops TR 4 through TR 6 and the gates G 28 through G 34 from the inputted frequency signals $f_{o1z}$–$f_{o3z}$. Thus, the output signal $f_o$ in the range 1Z may be, for example 16 Hz, in the range 2Z, it may be 32 Hz, and in the range 3Z, it may be 64 Hz. The time duration of these regions depends on the frequency $f_3$ which is conducted to the first T-flip-flop TR 1 of the waiting time element 7 and on the number of T-flip-flops in the chain TR1 to TR 6. With the variable frequency $f_o$, the frequency $f_1$ and $f_2$ respectively is generated in the subsequent frequency divider stages 82 and 83, which have half the frequency and respectively one fourth the frequency of the signal $f_o$ according to FIG. 4. The frequencies $f_1$ and $f_2$, together with the switchover signal $\beta$ and the negated switchover signal $\bar{\beta}$, are inputted to the subsequent driving logic circuit 9. Here, by means of the NAND gates G 16–G 25, they drive the switches S 1 through S 8 of the switching element 3 during the range where the switchover signal $\beta$=H, in such a fashion that the above-mentioned switching table for the switches S 1–S 8 is fulfilled. This switch-on logic for the switches S 1 through S 8 has as its result the pulse sequence shown in FIG. 4f for the coils 22 and 23 of the motor 2. The frequency of this pulse sequence, for example, may be 4 Hz in the range 1Z, 8 Hz in the range 2Z, and 16 Hz in the range 3Z. This self-starting control increases the rpm of the rotor 21, for example, from 0 to 8 revolutions per second, since the pulse sequence with the frequency of 16 Hz, with a rotor with two pole pairs, generates a rotational speed of 8 revolutions per second. The switchover instants, in the time plot of FIG. 4, are designated by $t_N$ for initiating the self-starting operation, by $t_P$ for switching over from the first range 1Z to the second range 2Z, by $t_R$ for switching over from the second range 2Z to the third range 3Z, and by $t_S$ for switching over from self-starting operation to nominal running operation.

If the output signal S of the third T-flip-flop TR 6 of the self-starting stage 8 is set into the state L at the end of the third range 3Z, the flip-flop 81 is set to L with the switchover signal $\beta$ and is set to H with the negated switchover signal $\bar{\beta}$, which implies a change of the previous self-starting operation to a nominal running operation. In nominal running operation, the second coil 23 of the motor 2 is used as a control coil or as a pick-up coil, whose output signals lead to the signals V and I as described above. During nominal running operation, the logic given in the switching table for the switches S 1 through S 8 holds for the range $\beta = L$.

Figure 5:
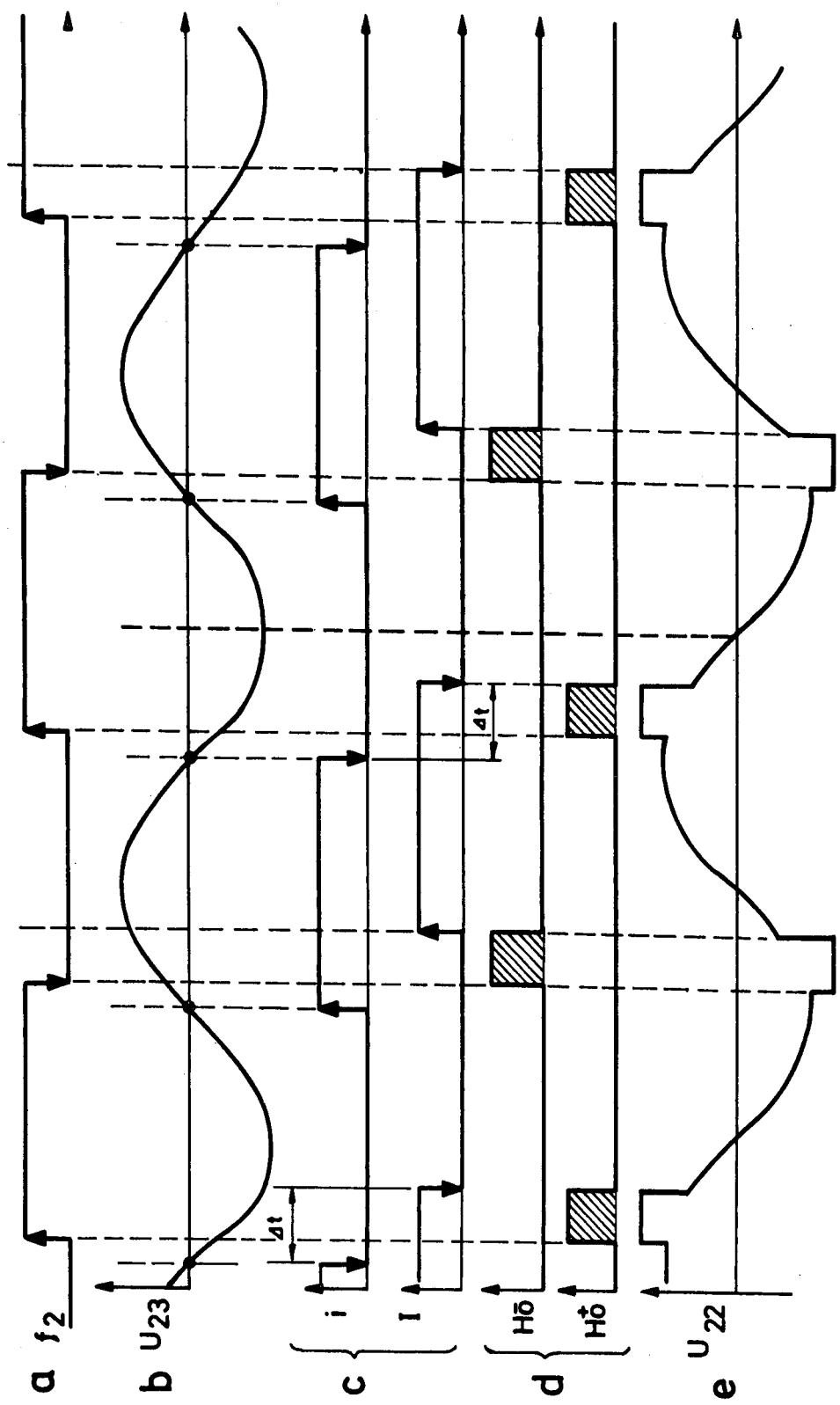

The nominal operating regulation will be explained in more detail by means of the time plot in FIG. 5, in connection with the regulation device for nominal operation 61 and 62, which is shown and described in FIG. 2. In this FIG. 5, the signals and their time dependence are shown as follows, from top to bottom:

(a) The design frequency $f_2$ emitted by the self-starting stage 8
(b) The voltage $U_{w1}$ (31 as against 1 in FIG. 2), which is tapped from the second coil 23, which now serves as a control coil.
(c) The digitalized voltage i, which is present at the output of the second comparator 42, as well as the signal I which is derived therefrom, and which is present at the output of the second noise-suppression and delay stage 52, and which is shifted by a time interval $\Delta t$ with respect to the signal i
(d) The nominal running pulses Ho+, Ho−, which are present at the output of the nominal operation regulation device 61, 62 and
(e) the voltage curve for the first coil 22, which is used as the working coil in nominal operation, where said voltage curve is formed by means of the driving logic circuit and the switching element.

From this, one derives the following mode of functioning:

The switch-on time for the pulses depends on the phase shift between the design frequency $f_2$ emitted by the self-starting stage 8 and the actual frequency (I-pulses) emitted by the second noise-suppression and delay stage 52. Thus, one nominal running pulse Ho− begins with the falling edge of the design frequency $f_2$ and ends with the rising edge of the actual frequency I. This pulse is generated by means of the already described linkage of the two D-flip-flops $D_{R1}$ and $D_{R2}$ as well as the two NOR gates G 12 and G 13. This nominal running pulse Ho− switches the two switches S 4 and S 8 of the switching element through the gates G 24 and G 19. The second nominal running pulse Ho+ begins with the rising edge of the design frequency $f_2$ and ends with the falling edge of the actual frequency I, and is generated (in) the two D-flip-flops DR 3 and DR 4 as well as by means of the two NOR gates G 14 and G 15. In nominal running operation, this nominal running pulse Ho+ switches the switches S 3 and S 7 of the switching element via the two gates G 22 and G 18 of the driving logic circuit. By alternate switching of these two switch pairs, the voltage shown in FIG. 4 is generated. This voltage is applied to the first coil 22. As already explained, the width of the pulses for the working coil 22 is determined by the phase shift between the design frequency $f_2$ and the actual frequency I, while the position of the pulses for the working coil is determined by the time delay $\Delta t$, which depends on the number of D-flip-flops of the second noise suppression and delay stage 52.

If the rotor 21 for any reason has not reached the required rotational speed for nominal operation at the end of self-starting operation, the self-starting operation is repeated. Since the output signal V of the first noise-suppression and delay stage 51 remains in the state L if the nominal rotation speed is not reached, the linkage of the output signals N and S of the respectively third T-flip-flops TR 3 and TR 6 of the waiting time element 7 and of the self-starting stage 8, both of which are in state L, takes care to produce a signal at the output of the gate G 9, which leads, through the two gates G 10 and G 11, to a reset signal for the T-flip-flop chain TR 1 through TR 6, so that self-starting operation can repeat.

As shown in FIG. 2, the two coils 22 and 23 of the reactive motor 2 enclose an angle $\Delta 22, 23$ between them which satisfies the following equation:

$$\Delta 22, 23 = k \cdot (\pi/2 - \phi 1) \text{ with } k = 1, 3, 5 \text{ and } \phi 1 = (0 \ldots 0.4) \cdot (\pi/2).$$

For example, for $k = 3$ and $\phi 1 = 0.27$, one obtains an angle $\Delta 22, 23 = 221°$ e1. For a rotor with pole pairs, this implies a geometric displacement of about 110°.

Figure 6:
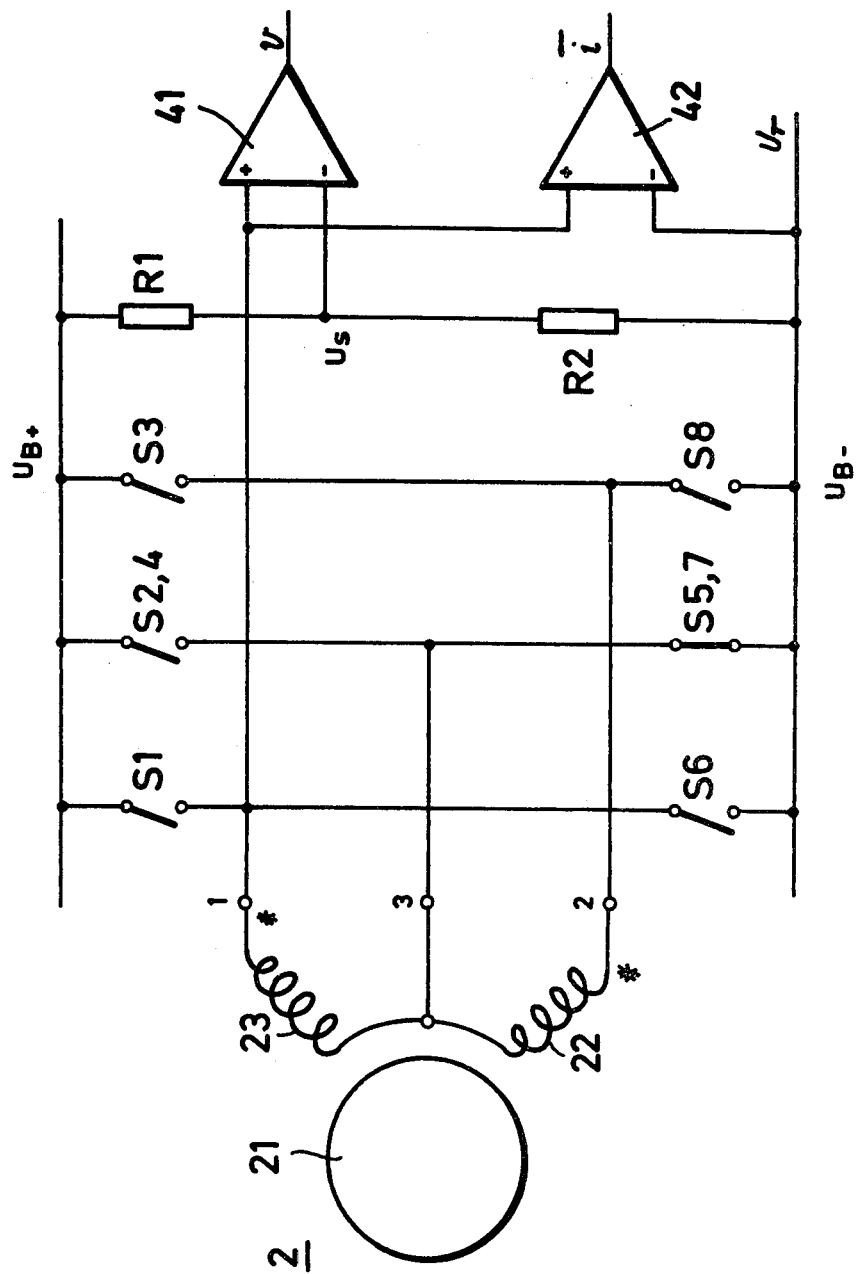
FIG. 6 shows a simplified coil arrangement of the reactive motor.

A variant of the solution with two separate coils 22 and 23 at the reactive motor 2 is shown in FIG. 6 and consists of two coils with three connections for the two coils 22 and 23. In this arrangement, two ends of the two coils 22 and 23 are connected together so that two switches of the switching element 3 as well as the corresponding NAND gates of the driving logic circuit are eliminated. This has been taken into account in FIG. 6, because the two switches S 2 and S 4 have been collected together to one switch S 2,4 and the two switches S 5 and S 7 have been collected together to one switch S 5,7. In addition, the end of the coil 22, has its terminal 3 constantly connected to the minus pole of the power supply $U_{B-}$ during nominal operation. This is taken into account by the switch S 5,7 remaining closed. For sensing and digitalizing of the rotational speed of the reactive motor 2, one end of the coil 23 is connected with the positive inputs of the two comparators 41 and 42, whose negative inputs are connected one the one hand (comparator 42) to the minus pole of the power supply $U_{B-}$ and, on the other hand, (comparator 41) to a reference voltage $U_s$.

Figure 7:
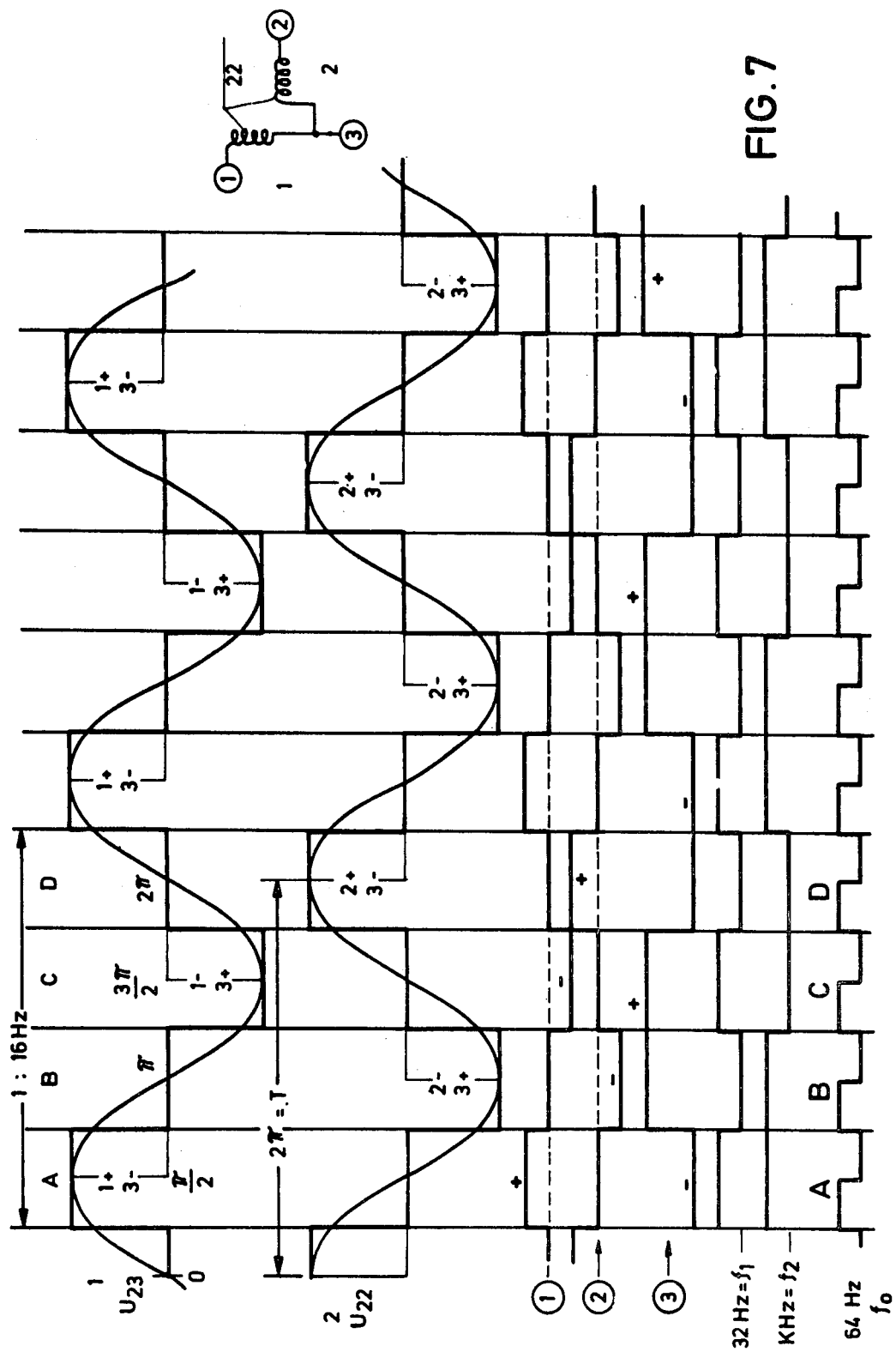
FIG. 7 shows a time representation of the pulses and signals when using the simplified coil arrangement.

The mode of functioning of this arrangement, in connection with the time plot of the signals in FIG. 7, is as follows:

FIG. 7 shows
(a) the voltages at the coils 1 and 2
(b) the signals at the ends of the coils 1, 2, and 3
(c) the output signals $f_1$, $f_2$ as well as $f_o$ of the self-starting stage.

In self-starting operation, there is a signal frequency $f_o$ as is shown in FIG. 7, from which the other two frequencies $f_1$ and $f_2$ are generated as described above. Leaning on the already above-mentioned switching table, one obtains for this simplified variant a switching table which corresponds to the above-mentioned one with the specification that the joint switches S 2,4 and S 5,7 in self-starting operation are always switched on when one of the two switches S 2, S 4 or respectively S 5, S 7 is switched on.

In nominal running operation, the joint terminal 3 of the two coils 22 and 23 is constantly connected to the minus pole of the power supply $U_{B-}$ by the closed switch S 5,7. The terminal 1 of the second coil 23 is constantly connected to the positive inputs of the comparators 41 and 42 by the opened switches S 1 and S 6. In this arrangement, the switch S 3 is switched on and off synchronously with the nominal running signal Ho+ which is emitted by the nominal running regulation device 62. The second nominal running signal Ho− is no longer used in this variant, since the first coil 22 can no longer be repoled.

With this variant, there are simplifications in virtue of the fact that in place of four coil connections, one requires only three connections, and in place of eight switches, one requires only six switches, and in place of three resistors to generate the reference voltage, one requires only two resistors, and for free running only six diodes are needed in place of eight diodes.

Figure 8:
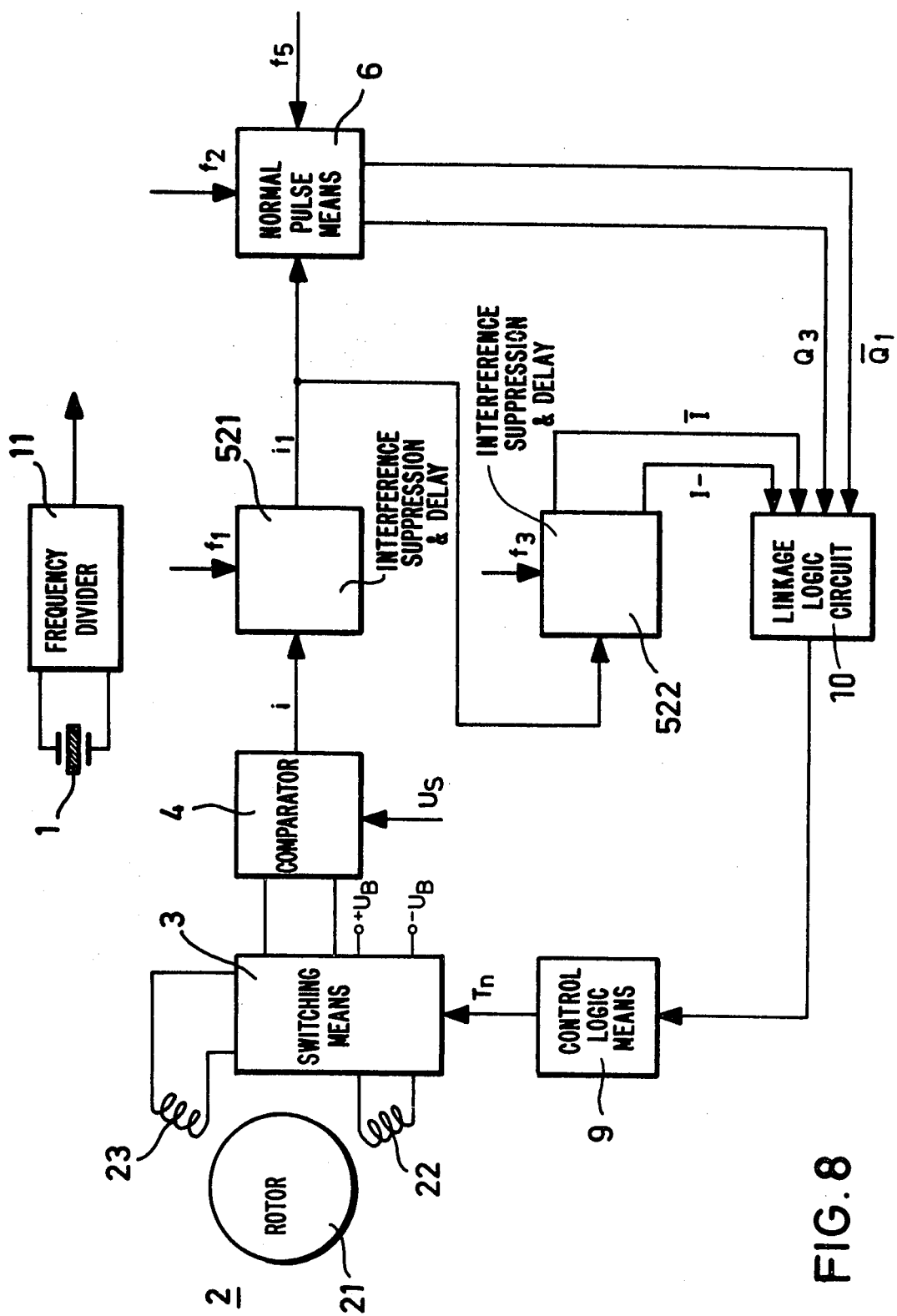

FIG. 8 schematically shows a reactive motor 2, which has a rotor 21 with poles formed of permanent magnets and a stator with two coils 22, 23, where said stator is not shown in more detail. If one of the two coils 22, 23 has pulses applied to it, the rotor 21 can be brought to a rotational speed that corresponds to the number of pole pairs and to the frequency. The rotations of the rotor 21 are transmitted through a shaft and through a transmission to a display system, for application in time-keeping devices, for example clocks. This makes it possible, for example, to have an analog display by means of several pointers and a number dial.

To sense the rotational speed n and consequently the actual frequency, one uses the control coil 23 of the stator as a sensor coil to emit a voltage $U_n$, proportional to the rotational speed, for regulating said rotational speed. This control coil 23, just like the working coil 22, lies within the range of influence of the magnetic lines of the poles of the rotor 21. When the rotor 21 rotates, the magnetic field lines of the poles periodically cut through the sensor coil 23. As a result, a sinusoidal voltage $U_n$, proportional to the rotational speed n and consequently to the actual frequency of the rotor 21, is present at the ends of the coil. The voltage $U_n$ has zero crossings, and is the so-called sensor signal. This voltage $U_n$, which is proportional to the rotational speed, together with a comparison voltage $U_s$, is applied to the inputs of a comparison element 4. Here, the sensor signal is converted into rectangular pulses for regulating the rotational speed. The vertical edges of the rectangular pulses lie at the interfaces with the constant comparison voltage $U_s$. The output signal i of the comparison element 4 is essentially rectangular and corresponds to the actual frequency. It is applied to the input of a series-connected interference-suppression element 521. The interference-suppression element 521 additionally has applied to it a first pulsing frequency $f_1$. The interference-suppression element 521 is constructed in the form of a divider chain on which a pulsing frequency $f_1$ is impressed. The interference suppression element 521 is supposed to eliminate erroneous signals, which are not useful signals of the actual frequency. This interference-suppression element 521 delivers interference-free signals $i_1$ both to a phase comparator 6, to which a second pulsing frequency is applied, and to a delay element 522, to which a third pulsing frequency $f_3$ is applied. The design frequency $f_2$, which is required for the phase comparison, is applied to the phase comparator 6 at another input. The pulse trains Q1 and respectively Q3, for accelerating or respectively braking the reactive motor 2, are present in the output of the phase comparator 6.

The delay element 522 is likewise constructed in the form of a divider chain, on which the third pulsing frequency $f_3$ is impressed. At its outputs, it delivers signals I and $\bar{I}$ which are delayed with respect to the interference-free actual-frequency signal $i_1$. The output signals I, $\bar{I}$; Q1, Q3 of the delay element 522 or respectively of the phase comparator 6 are applied to the inputs of a linkage logic circuit 10, which emits pulse sequences at its output, by the logical linkage of the input signals, through a gate circuit. These pulse sequences are connected with a switching stage 3, through a series-connected driving logic circuit 9, which likewise can be constructed from a certain number of gates. Both the supply voltage $\pm U_B$ and the control and working coils 22, 23 of the reactive motor 2 are connected to the switching stage 3. Controlled by the pulse sequences $T_n$, which are present at the output of the driving logic circuit 9, the switching stage 3 connects the coils 22, 23 of the reactive motor 2 with one or the other pole of the voltage source $+U_B$, $-U_B$.

A generator is associated with the entire arrangement. This generator has a quartz oscillator 1 and a frequency divider 11. Rectangular pulses with frequencies $f_s$, $f_1$–$f_3$ are present there, which are conducted to the component described above as pulsing frequencies.

Figure 9:
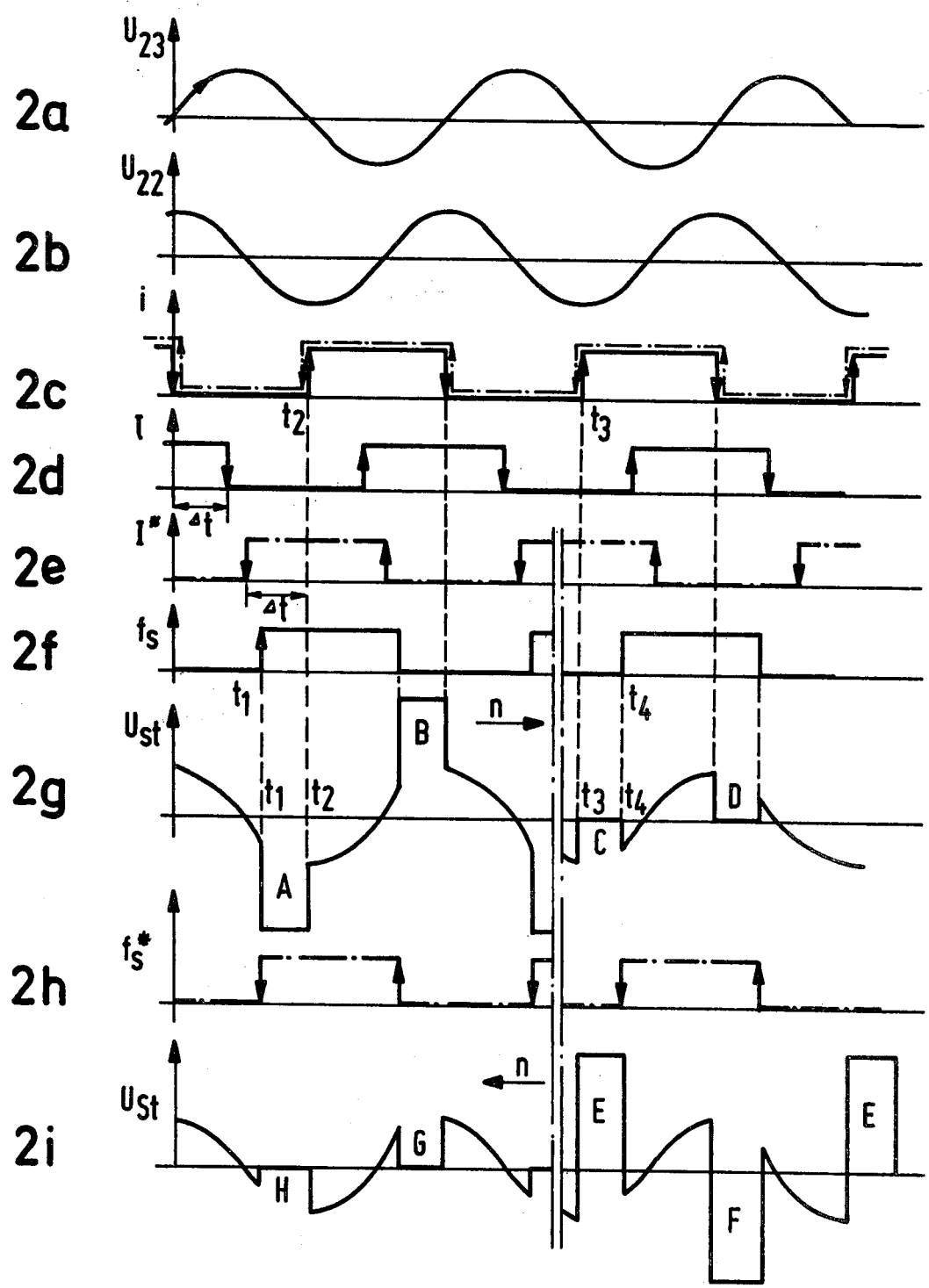

The mode of functioning of the arrangement according to FIG. 8 and consequently the mode of functioning of the process according to the invention will subsequently be explained by way of the time plot of individual signals in FIG. 9.

The sinusoidal voltages shown in FIGS. 9a and b represent the voltages at the control coil $U_{23}$ and at the working coil $U_{22}$, which are electrically displaced with respect to one another by 90°. By means of the comparison element 4, and by means of the adjusted reference voltage $U_s$, a rectangular output voltage i is generated (FIG. 9c). The correct sense of rotation of the rotor 21 and consequently of the control coil voltage $U_{23}$ has here been shown by a solid line, and the sense of rotation that is opposite to the correct one has been shown by a dash-dot line. This rectangular output signal i of the comparison element 4 is freed from noise signals by means of the interference-suppression element 521. It is conducted to the series-connected delay element 522, as the signal $i_1$. The output signal I of the delay element 522 is shown in FIG. 9d. With respect to the rising or respectively the falling edge of the actual frequency signal i, the signal I is delayed by time $\Delta t$. In FIG. 9e, this signal, delayed by a time $\Delta t$, is shown as the signal I* for the sense of rotation opposite to the correct sense of rotation.

FIG. 9f shows the rectangular design-frequency signals $f_s$, the frequency of which is determined by the internal reference clock, i.e., crystal oscillator 1. As can be seen from this time plot, the rising edge of the design frequency $f_s$ at time $t_1$ occurs before the rising edge of the actual-frequency signal i at the time $t_2$, in the correct sense of rotation. In this time range, between the time $t_1$ and $t_2$, i.e. beginning with the rising edge of the design frequency $f_s$ and ending with the rising edge of the actual frequency signal i in the negative half-wave region and beginning with the falling edge of the design frequency signal $f_2$, and ending with the falling edge of the actual frequency signal i in the positive half-wave region, the working coil 22 receives accelerating pulses. These accelerating pulses, which are shown in FIG. 9g as pulses A and B, are applied to the working coil 22, however, only if the delay signal I=low in the negative half-wave region, or respectively if the delayed actual frequency signal I=high in the positive half-wave region. If the delayed actual frequency signal I were to rise or fall within the time region which lies between the rising or respectively falling edges of the design frequency signal $f_s$ and the actual frequency signal i, the accelerating pulse A or respectively B would decline in correspondence with the rising or respectively falling edge of the delayed actual frequency signal I.

If the actual frequency signal i leads the design frequency signal $f_s$, i.e. if the rising edge of the actual frequency signal i, at the time $t_3$ occurs before the rising edge of the design frequency signal $f_s$ at the time $t_4$, the rotor 21 of the reactive motor 2 is braked by the short-circuiting of the working coil 22. This short-circuiting of the working coil 22 takes place with the rising edge of the actual frequency signal i and ends with the rising edge of the design frequency signal $f_s$ (region C) and/or with the falling edge of the actual frequency signal i and the falling edge of the design frequency signal $f_s$ (region D).

In the time plots of FIGS. 9h and i, the circumstances are shown which occur when the sense of rotation of the rotor 21 is opposite to the correct sense of rotation. For the sake of better understanding, the behavior of the design frequency signal $f_s$ must merely be regarded from right to left, i.e. in the direction of the drawn-in arrow. Since the position of the design frequency signal $f_s$ does not change with respect to the correct sense of rotation, pulses are generated in the region where the design frequency signal $f_s$ leads the actual frequency signal i, through the linkage of the actual frequency signal I* which is shown delayed in FIG. 9e, for the opposite sense of rotation in the regions E and F (FIG. 9i). These pulses appear as accelerating pulses, but they brake the rotor 21 since they are supposed to accelerate only in the correct sense of rotation. This effect is achieved by using the actual frequency signals i as control pulses and by limiting the actual frequency signals i through the regions of the delayed actual frequency signals I*.

If, subsequently, the actual frequency signal i occurs before the design frequency signal $f_s$, the braking pulses G and H are generated by short-circuiting the working coil 22. These likewise brake the rotor 21, so that the sense of rotation opposite to the correct sense of rotation is no longer possible.

Figure 10:
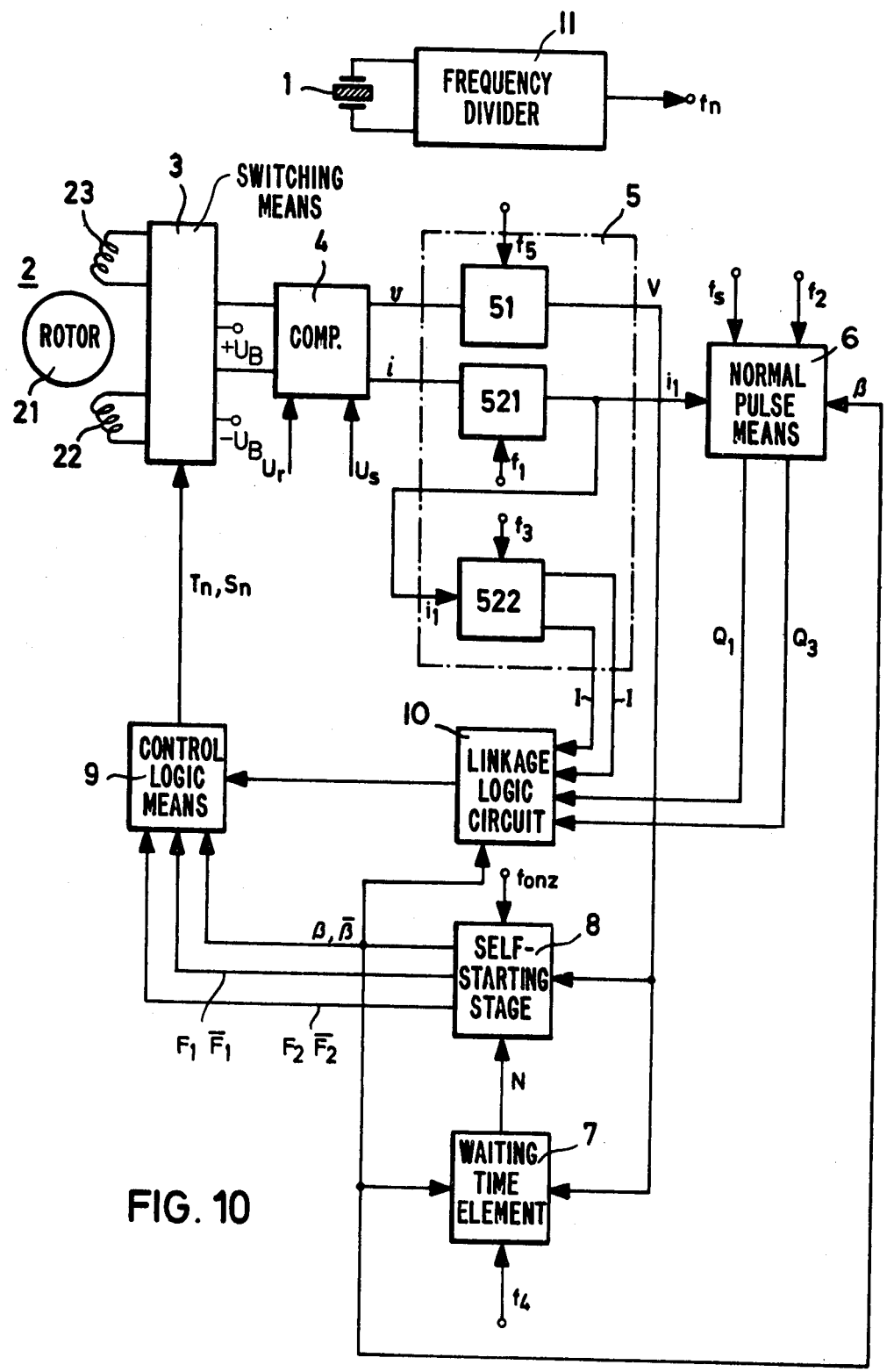

FIG. 10 shows a block circuit diagram of an exemplary embodiment with a self-starting motor. This embodiment has the reactive motor 2, which comprises a rotor 21, with poles formed by permanent magnets, and a stator with the two windings 22 and 23, where this stator is not shown in more detail. Analogous to the arrangement according to FIG. 1, the control coil 23 is connected with a comparison element in order to sense the rotational speed n and to deliver a voltage $U_n$, proportional to said rotational speed, to control the rotational speed, and respectively as a criterion to initiate self-starting operation. Two comparison voltages $U_r$ and $U_s$ are applied to the comparison element. These comparison voltages convert the sinusoidal signal, which is tapped at the control coil, into two rectangular pulses for regulating the rotational speed and respectively for initiating self-starting operation. The vertical edges of the rectangular signals lie at the interfaces with the constant comparison voltages $U_r$ and $U_s$. The output signals v and i of the comparison element 4 are essentially rectangular and are applied to the input of a series-connected interference-suppression and delay element 51 for the output signal v and respectively an interference-suppression element 521 for the signal i. The interference-suppression and delay element 51 for the output signal v has impressed on it a pulsing frequency $f_5$, while the interference-suppression 521 for the output signal i has impressed on it a pulsing frequency $f_1$. The interference-free output signal i, as the actual frequency signal $i_1$, is applied both to a series-connected phase comparator 6 and to a delay element 522.

The delay element 522 has impressed on it a third pulsing frequency $f_3$. At its outputs, it delivers interference-free and delayed actual frequency signals I and respectively negated signals Ī. The interference-suppression and delay elements 51, 521, and 522 for the output signals v and i are, in this embodiment, collected together to a common interference-suppression and delay element 5, shown by dots and dashes.

The phase comparator 6 has applied to it not only the interference-free actual frequency signal $i_1$, but also a second pulsing frequency $f_2$ and a design frequency signal $f_s$, which is necessary for the phase comparison, as well as a switch-over signal $\beta$. The outputs of the delay element 522 and of the phase comparator 6 as well as the switch-over signal $\bar{\beta}$ are connected with the inputs of the linkage element 10. In a manner that has already been described above, the linkage element 10 delivers braking or respectively accelerating signals at its output to a driving logic circuit 9.

In addition to the interference-free and delayed self-starting signal V, which is emitted by the interference-suppression and delay stage 51, one or more frequency signals $f_{onz}$ which differ from one another, as well as a prescribable signal N, are additionally inputted into the self-starting stage 8. The prescribable signal N is generated in a waiting time element 7, which consists of one or more delay stages and to which a fourth pulsing frequency $f_4$ is inputted. The reset inputs of all delay stages of the waiting time element 7 are reset synchronously, in dependence on the self-starting signal V, which is likewise inputted, and which is noise-free and delayed, and in dependence on the switch-over signal $\beta$.

From the self-starting stage 8, the following signals are conducted to the driving logic circuit 9, which is connected on the output side: The switch-over signal $\beta$ or respectively the negated switch-over signal $\bar{\beta}$, two pulse trains $F_1$ or respectively $\bar{F}_1$, also $F_2$ or respectively $\bar{F}_2$, together with the output signal of the linkage logic circuit 10. Driving logic circuit 9 outputs pulse trains Tn, Sn which are provided to switching stage 3 which is electrically interposed between the voltage terminals $+U_B$, $-U_B$ and the coils 22 and 23 of the reactive motor 2. The switching stage 3 here connects the working coil 22 of the reactive motor 2, or respectively in self-starting operation, both the working coil 22 and the control winding 23 of the reactive motor 2, with one or the other pole of the voltage source $+U_B$ or respectively $-U_B$.

Analogous to the arrangement according to FIG. 8, a generator is also associated with this arrangement. This generator has a quartz oscillator 1 and a frequency divider 11. Rectangular pulses with the pulsing frequencies $f_1$–$f_5$ and the frequencies $f_{onz}$ and the frequency $f_s$ for the design frequency signal are present thereat, and are conducted at the above-mentioned points to the corresponding components in the arrangement.

Figure 11:
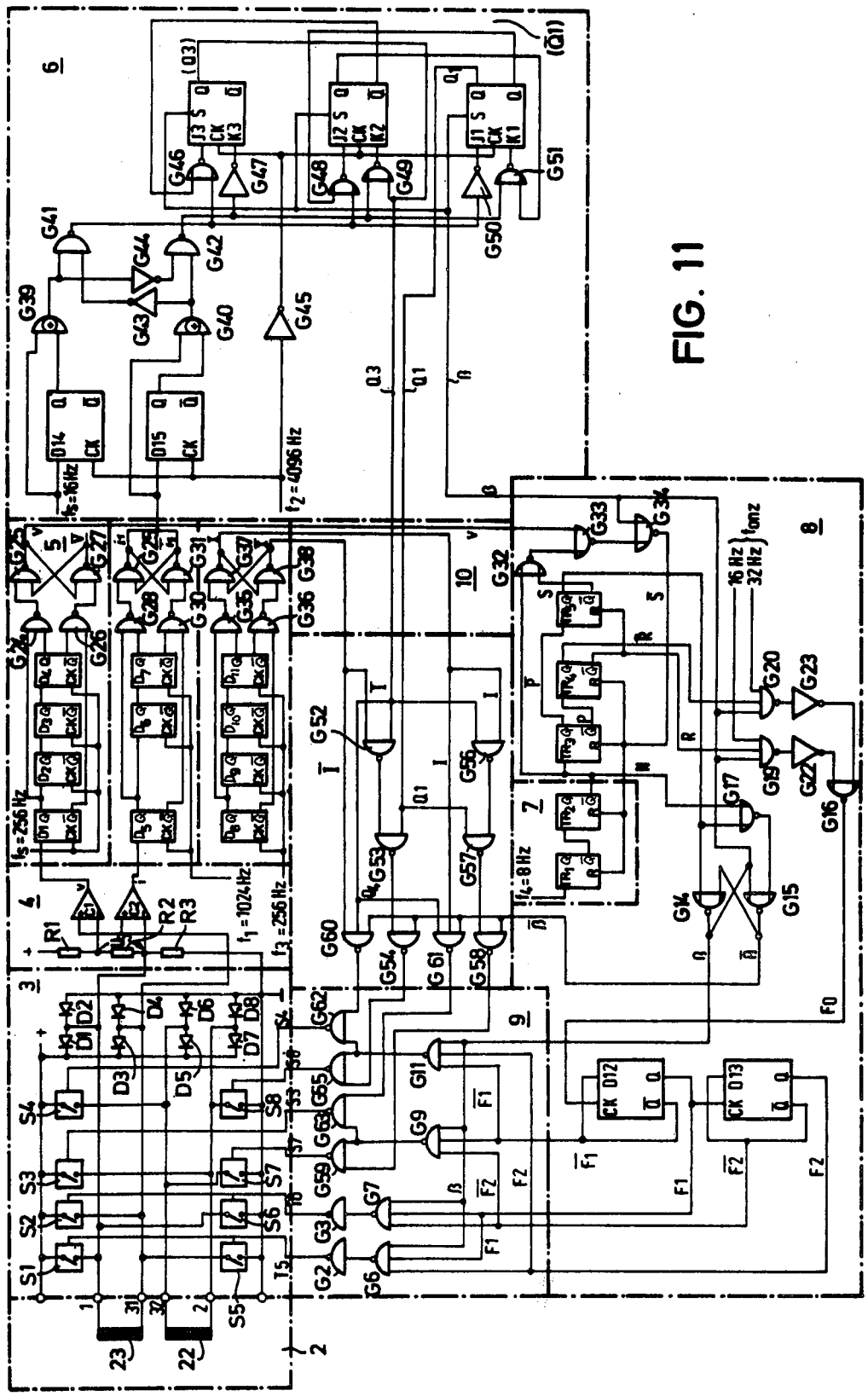

FIG. 11 is a detailed schematic of the control circuit shown in block format in FIG. 10.

The comparison element 4 contains two comparators 41 and 42, whose positive inputs are connected to one end of the control coil 23. While the negative input of the first comparator 41 is connected to one reference voltage $U_s$, the negative input of the second comparator 42 is connected to the other reference voltage $U_r$ and to the other end of the control coil 23. The reference voltages $U_r$ and respectively $U_s$ are tapped at a resistance divider with the resistors R1 through R3.

The outputs of the two comparators 41 and 42, with the output signals v and i, are separately conducted to an interference-suppression and delay stage 51 or respectively to the interference-suppression stage 521. The interference-suppression and delay stage 51 contains four series-connected, pulsed flip-flops D1–D4, whose pulse inputs $C_k$ have synchronously impressed on them a specifiable fifth pulsing frequency $f_5$, in this case a frequency of 256 Hz. The input of the first pulsed flip-flop D1 is connected with the output of the first comparator 41. The outputs Q of the pulsed flip-flops D1–D3 are respectively connected with the input of the next following pulsed flip-flops D2–D4. The output of the last flip-flop D4 is connected to the input of a series-connected first NAND-gate G 24. The other input of this NAND-gate is connected to the output of the respectively first pulsed flip-flop D1. The negated outputs $\overline{Q}$ of the first or respectively last pulsed flip-flop D1 or respectively D4 are connected to the inputs of the second NAND-gate G 26.

The interference-suppression element 521 contains three series-connected pulsed flip-flops D5–D7, and a first pulsing frequency $f_1$, in this case a frequency of 1024 Hz, is applied to the pulsing input $C_k$ of the aforementioned flip-flops. Corresponding to the interference-suppression and delay stage 51, the input of the first pulsed flip-flop D5 is connected with the output of the second comparator 42 and therefore with the actual frequency signal i. The outputs Q of the pulsed flip-flops D5 and D6 are respectively connected with the input of the next following pulsed flip-flop D6 and respectively D7. The output of the last flip-flop D7 is connected to the input of a series-connected first NAND-gate G 28. The output of the first pulsed flip-flop D5 is connected to the other input of said NAND-gate G 28. The negated outputs $\overline{Q}$ of the first and last pulsed flip-flops D5 and D7 are connected to the input of a second NAND-gate G 30.

The delay element 522 for the interference-free actual-frequency signal $i_1$ is constructed analogously to the interference-suppression and delay stage 51, and contains the pulsed flip-flops D8–D11 whose pulsing inputs $C_k$ have applied to them synchronously a third pulsing frequency $f_3$, in this case a frequency of 256 Hz. The following arrangement is common to all three elements 51, 521, and 522: The outputs of the first two NAND-gates G 24, G 26, G 28, G 30, and G 35, G 36 are connected with the input of a third and respectively fourth NAND-gate G 25, G 27, G 29, G 31 and respectively G 37, G 38, whose other input is always connected with the output of the respectively other NAND-gate G 25 or respectively G 27, G 29 or respectively G 31, G 37 or respectively G 38. The output signal V of the interference-suppression and delay stage 51, which is identical with the output signal of the NAND-gate G 25, is connected through the input of the series-connected self-starting stage 8. The noise-free actual-frequency signal $i_1$, which is identical with the output signal of the NAND-gate G 29, as already described, is connected both to the input of the phase comparator 6 and to the input of the delay stage 522. The interference-free and delayed output signals I and $\bar{I}$, which are delivered the NAND-gates G 37 and G 38, are applied to the inputs of the linkage logic circuit 10, which is connected in series on the load side.

The phase comparator 6 contains two pulsed flip-flops D14, D15, whose pulsing inputs $C_k$ have applied to them a second pulsing frequency $f_s$ of 4096 Hz. The input of the first pulsed flip-flop D14 has applied to it the design-frequency signal $f_s$, for example 16 Hz, while the input of the second pulsed flip-flop has applied to it the noise-free actual-frequency signal $i_1$. The outputs Q of the two pulsed flip-flops D14 and D15 are connected with one input of one exclusive OR-gate G 39 and G 40, where said OR-gates are connected in series on the load side. The other inputs on these OR-gates have applied to them the design-frequency signal $f_s$ or respectively the noise-free actual-frequency signal $i_1$. The outputs of the two exclusive OR-gates G 39, G 40 are connected to one input each of one NAND-gate G 41 and respectively G 42, where said NAND-gates are connected in series on the load side. They are also connected, through an inverter G 43 and respectively G 44 to the other input of the respectively other NAND-gate G 42 and respectively G 41. The outputs of these two NAND-gates G 41 and G 42, together with the second pulsing frequency $f_2$, which is conducted over an inverter G 45 and the switch-over signal $\beta$ are conducted to a shift register. This shift register comprises three J/K flip-flops J1–J3 as well as OR-gates G 46, G 48, G 49, G 51 as well as two other inverters G 47 and G 50. The set-inputs S of the J/K flip-flops J1–J3 have applied to them the switch-over signal $\beta$, while the pulsing inputs $C_k$ of the flip-flops are connected to the inverted pulsing frequency $f_2$. The J-inputs of the J/K flip-flops J1–J3 are connected to the outputs of the OR-gates G 46, G 48 or respectively to the output of the inverter G 50. The two OR-gates G 46 and G 48, and the inverter G 50, are connected to the output of the first NAND-gate G 41. The two other inputs of the OR-gates G 46 and G 48 are connected to the negated outputs $\overline{Q}$ of the second J/K flip-flop J2 or respectively the first J/K flip-flop J1. The K inputs of the three J/K flip-flops J1–J3 are connected in cyclic permutation with the outputs of an inverter G 47 or respectively with the outputs of two OR-gates G 49 and respectively G 51. One input each of the two OR-gates G 49 and G 51 as well as the input of the inverter G 47 are connected to the output of the second NAND-gate G 42. The two other inputs of the OR-gates G 49 and G 50 are connected with the outputs Q of the second or respectively third J/K flip-flops J2 and J3. The outputs Q1 and Q3 of the first or respectively third J/K flip-flop are conducted to the linkage logic circuit 10 for further signal processing.

The mode of functioning of the phase comparator 6 will be explained briefly below:

Two pulse trains are compared with one another by means of the two pulsed flip-flops D14 and D15, and EXCLUSIVE OR gates G 39, G 40, the inverters G 43, G 44, and the NAND-gates G 41 and G 42. One pulse train is derived from the design-frequency signal $f_s$, and the other pulse train is derived from the noise-free actual-frequency signal $i_1$. Since both frequencies $f_s$ and $i_1$ are mutually phase-shifted in the normal case, signals are generated in dependence on the phase shift between the two frequencies, and these signals cause the acceleration or braking of the rotor 21 of the reactive motor 2, corresponding to the time plot of FIG. 2. The shift register is necessary in this embodiment, in order to store the phase shift between the design-frequency signal $f_s$ and the actual-frequency signal $i_1$ after self-starting operation has been initiated. Of course, in place of the shift register, an ascending-descending counter can also be used. The number of J/K flip-flops in the shift register can be enlarged from the number three, which has been chosen in this embodiment, to n. In this way, the signals $Q_1$ and $Q_3$, which are emitted by the shift register to regulate the rotational speed, appear in the output of a chain, which comprises more than three J/K flip-flops. With a large number of J/K flip-flops, the memory capacity of the shift register for the position of the design-frequency signals with respect to the position of the actual-frequency signals is increased. The output signals $I$, $\bar{I}$ as well as $Q_1$, $Q_3$ of the delay stage 522 or respectively of the phase comparator 6 as well as the negated switch-over signal $\bar{\beta}$ and the outputs of the respectively preceding NAND-gates are connected to the inputs of the NAND-gate of the linkage logic circuit 10, in accord with the following listing:

(a) Gate G 52: Signal $\bar{I}$ and $Q_3$
(b) Gate G 56: Signal $I$ and $Q_3$
(c) Gate G 53: Output signal gate G 52 and signal $Q_1$
(d) Gate G 57: Output signal gate G 56 and signal $Q_1$
(e) Gate G 60: Signal $\bar{I}$, signal $Q_3$, switch-over signal $\bar{\beta}$
(f) Gate G 54: Output signal of the gate G 53 and switch-over signal $\bar{\beta}$
(g) Gate G 61: Signal $Q_3$, signal $I$ and switch-over signal $\bar{\beta}$
(h) Gate G 58: Output signal of the gate G 57 and switch-over signal $\beta$ The output signals $\beta$, $F_1$, $\bar{F}_1$ and $F_2$, $\bar{F}_2$ of the self-starting stage 8, and the output signals of the linkage logic circuit 20, are logically collected together in the driving logic circuit 9 by means of 10 NAND-gates, where the driving logic circuit 9 is connected in series on the load side. The signals $F_2$, $F_1$ and the switch-over signal $\beta$ are applied to the inputs of a first NAND-gate G 6. The switch-over signal $\beta$ and the signals $F_1$ and $\bar{F}_2$ are likewise applied to a second NAND-gate G 7. A third NAND-gate G 9 receives the signals $\bar{F}_2$, $\bar{F}_1$ as well as the switch-over signal $\beta$. The switch-over signal $\beta$, together with the signals $\bar{F}_1$ and $F_2$, is likewise conducted to a fourth NAND-gate G 11. The output signals of the first two NAND-gates G 6 and G 7 are delivered over two inverters G 2 and G 3 to the switching stage 3 which is connected in series on the output side. The output signal of the third NAND-gate G 9 is applied to one input each of two NAND-gates G 59 and G 63, which are connected in series on the output side, and whose other inputs are connected with the output signals of the NAND-gate G 61 and G 58 of the linkage logic circuit. The output signal of the NAND-gate G 11 is applied to the input of two other NAND-gates G 55 and G 62, whose other inputs are connected with the two other output signals of the NAND-gates G 60 and G 54 of the linkage logic circuit 10.

The outputs T5, T6 and respectively S3, S4, S7 and S8 of the driving logic circuit are used to control the eight switches S1–S8 of the switching stage 3, whose switching connections are connected in cyclic permutation respectively to the positive or negative battery terminal $+U_B$ and $-U_B$, to one or the other end of the control and working coils 22 and 23 in self-starting operation or respectively to the working coil 22 in regulation operation of the reactive motor 2. One output signal T5, T6 or respectively S3, S4, S7 or S8 here always activates the switches, which are connected to one or the other battery pole and to one or the other end of one of the two coils 22 or 23. The diodes D1–D8 are arranged in the switching stage, and are connected in parallel with the two coils 22 and 23, in such a fashion that the magnetic energy stored in the coils 22 and 23 is delivered back to the supply battery after the switches S1–S8 turn off.

The revolutions of the motor rotor 21 are transmitted, by means well known in the art, through a shaft that is not shown in more detail, to a transmission, and from the latter through a further shaft, to a display system, which, for example, makes possible an analog display by means of several pointers and a number dial.

The mode of functioning of the method according to the invention and of the arrangement according to the invention, in accord with this embodiment, will be explained briefly below.

When the rotor 21 of the reactive motor 2 rotates, the magnetic lines of the poles N and S periodically cut the magnetic field lines of the control coil 23. This generates a sinusoidal voltage with zero crossings, the so-called sensor signal. By comparison with the reference voltages $U_r$ and $U_s$ in the two comparators 41 and 42, which can also be designated as pulse shapers, the sensor signal is converted into rectangular pulses, whose vertical edges lie at the intersection points of the sensor signal with the reference voltages $U_r$ and $U_s$.

In the regions where the sensor signal is larger than the respective reference voltage $U_r$ or $U_s$, a rectangular signal v or respectively i is emitted. The comparators 41 and 42 consequently utilize the sensor signal, so that the output signals v and i at the output of the two comparators 41 and 42 are essentially rectangular. The signal v is H (for high potential) only when the sensor signal is greater than the reference voltage $U_s$. In this way, for example, the system reports when the rotational speed of the rotor falls below a rotational speed which corresponds to the reference voltage $U_s$. However, this reference voltage $U_s$ is also used as an increased noise-level spacing, so that possible disturbances in the control coil 23, which are smaller than the reference voltage $U_s$, do not appear in the output signal v at the output of the first comparator 41. The digitized output signals v and i of the comparators 41 and 42 are applied to the inputs of the interference-suppression and delay stage 51 or respectively to the inputs of the interference suppression stage 521, where the above-mentioned stages are connected in series on the output side. These stages 51 and respectively 521 operate on the basis of a delay stage, whereby the delay of the interference-suppression stage 521 is negligible because of the high pulsing frequency that is applied to it. Only for conditions (L)(H), which last longer than a time interval $\Delta t$, will a change appear in the signal after the relevant interference-suppression and delay stage or respectively interference-suppression stage, so that noise pulse peaks in the form L-H-L or H-L-H in the output signals v and i of the two comparators 41 and 42, which are shorter than the above-mentioned time interval $\Delta t$, are not transmitted through the relevant interference-suppression and delay element 51 or respectively the interference-suppression element 521. The output signal V of the interference-suppression and delay stage 51 here fulfills the following function. If the rotation speed of the rotor 21 of the reactive motor 2 falls below a certain limit, so that the output signal V of the interference-suppression and delay stage 51 no longer reaches H (for high potential) during a certain time interval, the reset input R of the T-flip-flops TR1 through TR4 of the waiting element 7 and the self-starting stage 8 remains at L (for low potential) during this time interval. It is here presupposed that the switch-over signal $\beta$ was (L) from its preceding state in normal operation, and that at least one of the two output signals N or S of the waiting time element 7 or respectively the third T-flip-flop TR5 of the self-starting stage 8 was in the state (H). If the signal remains in the state (L) during a certain time interval, for example because the rotor 21 of the reactive motor 2 is no longer moving, the output N of the second T-flip-flop TR2 of the waiting element 7 is set into the state (L) and on its part sets the NAND-gates G14 and G15, so that the switch-over signal $\beta$ is set to the state (H) and the negated switch-over signal $\overline{\beta}$ is set to the state (L). After $\beta$ has become H, and as long as the switch-over signal $\beta$ remains in this state, the T-flip-flops TR1-TR5 are prevented from being set to null, since the output of the NOR-gate G34, i.e. the reset signal of the T-flip-flops TR1-TR4, remains in the state (L) on account of $\beta$=H. As long as the switch-over signal $\beta$ remains in the state (H), self-starting operation will continue according to the principle of a stepping motor with two coils. During this time, the frequency signal $F_o$, which is emitted by the NOR-gate G16 in the self-starting stage 8, assumes different values, in dependence on the point in time within the region where the switch-over signal $\beta$=H. The various values are generated by means of the T-flip-flops TR3-TR4 and the gates G19, G20, as well as the inverter G22 and G23, from the inputted frequency signals of 16 and 32 Hz. Thus, the output signal $F_o$ in the first region, for example, may be 16 Hz and in the second region 32 Hz. The duration of these regions depends on the pulsing frequency of 8 Hz, which is conducted to the first T-flip-flop TR1 of the waiting time element 7, and on the number of T-flip-flops of the entire chain TR1-TR5. By means of the variable frequency $F_o$, the frequency sequence $F_1$ or $F_2$ is generated in the frequency step-down stages D12 and D13, which are connected in series on the output side. The frequency sequences $F_1$ and respectively $F_2$ have half the frequency and respectively a quarter of the frequency of the signal $F_o$. The frequency signals $F_1$, $F_2$, together with the switch-over signal $\beta$, are inputted into the driving logic circuit 9, which is connected in series on the output side, where, with the aid of the NAND-gate, they activate the switches $S_1$-$S_8$ of the switching element 3 in the region where the switch-over signal $\beta$=H, in such a fashion that the above mentioned conditions are fulfilled. In this way, the coils 22 and 23 of the reactive motor 2 have impressed on them the rising frequency, in certain regions, during self-starting operation. This self-starting control increases the rotational speed of the rotor 21, for example, from 0 to 8 rotations per second, since the pulse sequence with frequency 16 Hz generates a rotational speed of 8 revolutions per second, in the case of a rotor with two pole pairs. The switch-over time-points in self-starting operation from one frequency to another can here be specified arbitrarily.

If the output signal S of the third T-flip-flop TR5 of the self-starting stage 8 of the last region goes into the state (L), the switch-over signal $\beta$ jumps to L and the negated switch-over signal $\overline{\beta}$ jumps to H, which implies a change of the previous self-starting operation in the rotation-regulation operation of the reactive motor 2. In rotation-regulation operation, the control coil 23 of the motor 2 serves as a so-called "pick-up" coil, whose output signals lead to the signals V and I, as described above. Since the negated switch-over signal $\overline{\beta}$, after termination of self-starting operation, has jumped into the state (H), the outputs of the linkaging circuit 10 are switched active, and the rotation-regulation operation, as described above, can control the rotational constancy of the reactive motor, as described above.

During self-starting operation, the switch-over signal $\beta$ is in the state (H) and consequently sets the J/K flip-flops of the shift register to high potential. Every design-frequency signal change from H to L or from L to H, corresponding to the rising or respectively falling edges of the design-frequency signal, causes another counting step in the shift register and each actual-frequency signal change, i.e. each rising or falling edge of the actual-frequency signal yields a backwards counting step in the shift register or respectively in the up/down counter. If the output $Q_3$ of the phase comparator 6 is set into the state (H), the working coil 22 is connected as follows to the positive or respectively negative pole of the batter $\pm U_B$.

If the noise-free and delayed actual-frequency signal I is in the State (H), the coil terminal 2 of the working coil 22 is connected to the plus pole of the battery, and the coil terminal 32 of the working coil 22 is connected to the minus pole of the battery $U_B$.

If the noise-free and delayed actual-frequency signal I is in the state (L), the coil terminal 2 of the working coil 22 is connected to the minus pole of the battery, and the terminal 32 of the coil is connected to the plus pole of the battery $U_B$.

On the other hand, if the output $Q_1$ of the phase comparator 6 is in the state L, the working coil 22 is short-circuited, for example, in such a fashion that the coil terminal 2 and the coil terminal 32 are connected to the minus pole of the battery $U_B$.

If the rotor 21, at the end of self-starting operation, has for any reason not reached the rotational speed required for rotational speed regulation operation, self-starting operation is repeated. Since the output signal V from the interference-suppression and delay stage 51 continues in the state L if the rated rotational speed has not been reached, the linkage of the output signals N and S of the waiting time element 7 and of the third T-flip-flop TR5 of the self-starting stage 8, both of which are in state L, takes care that a signal appears at the output of the gate G32, which leads to a reset signal for the T-flip-flop chain TR1-TR4, via the two gates G33 and G34, which are connected in series on the output side. In this way, self-starting operation can repeat.

Figure 12:
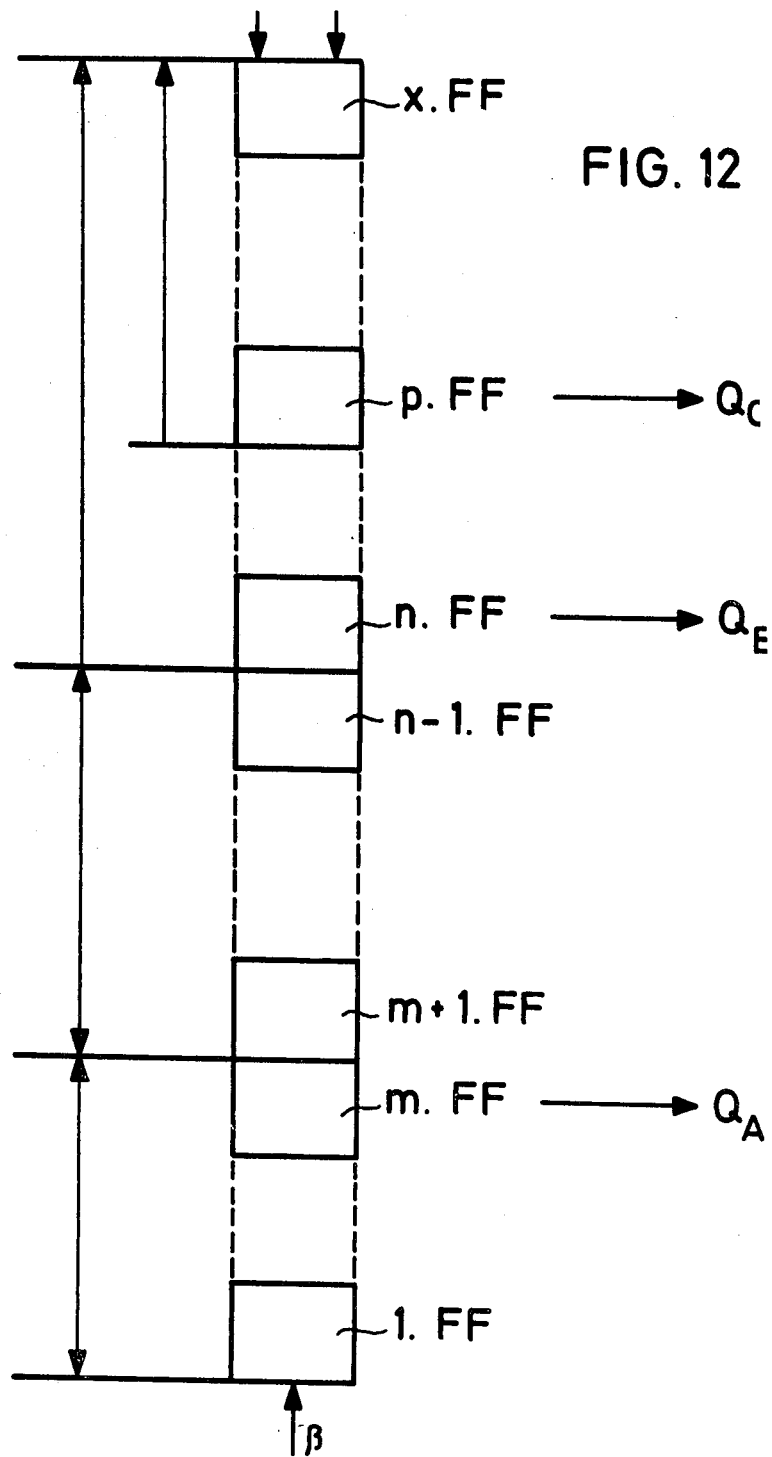

FIG. 12 schematically shows a shift register which consists of a number of x-flip-flops. FIG. 11 shows a detailed circuit diagram of the control and regulation arrangement for a reactive motor with self-starting means. This control and regulation arrangement has a shift register in its phase comparator 6, where said shift register is composed of three J/K flip-flops. The number of J/K flip-flops in the shift register can be increased to a number x, so that the various control signals $Q_A$, $Q_B$, $Q_C$ appear in a chain, which comprises x J/K flip-flops. In this way, the memory capacity for the position of the design-value signals before or after the actual-value signals is increased, and the capacity of the entire arrangement to recover lost pulses is improved. The shift register shown in FIG. 12 accordingly contains x flip-flops, to which the design-value signals and actual-value signals are conducted. The first m-flip-flops are here used for memory and for delivering braking pulses. The flip-flops from m+1 to n−1 are used to store waiting pulses. The flip-flops n to x are used for storing and delivering acceleration pulses in the region of positive polarity of the voltage that is applied to the driving coil. The flip-flops from p through x are used to store and to deliver additional acceleration pulses, even in the negative polarity that is applied to the driving coil. In the embodiment, the output pulses $Q_A$, $Q_B$, $Q_C$ are tapped at the mth, nth, and pth flip-flops of the chain.

Every change of the design-value from H to L or L to H yields another step in the chain of flip-flops in the direction of the xth flip-flop. Every change of the actual-value from H to L or L to H yields another step in the chain of flip-flops in the direction of the first flip-flop. In this way, the regulation sensitivity for delivering braking and acceleration pulses can be adjusted with arbitrary fineness both in the positive and negative polarity.

Figure 13:
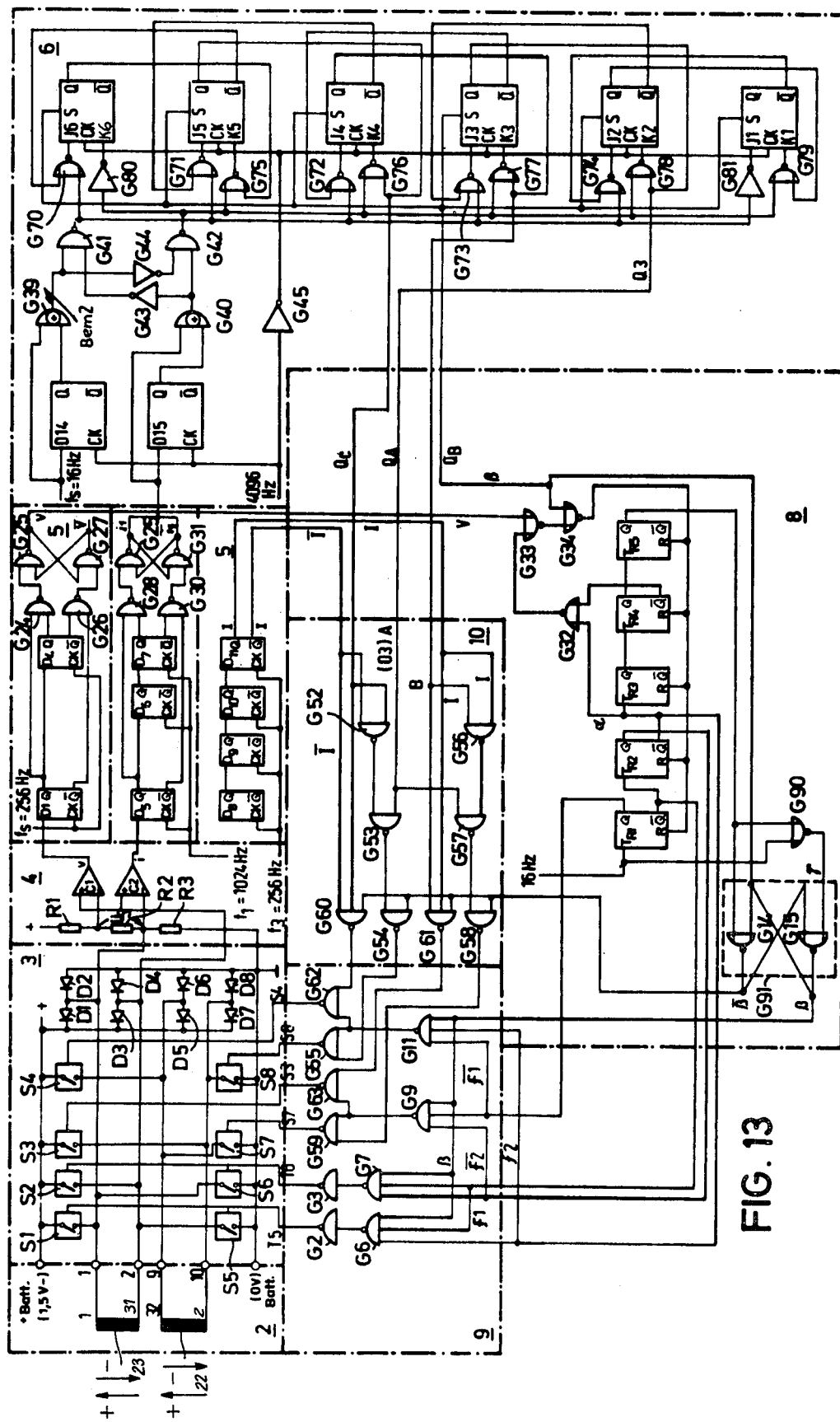

FIG. 13 shows a detailed circuit diagram of the control and regulation arrangement for a reactive motor with self-starting means. This arrangement essentially corresponds to the detailed circuit according to FIG. 11. Accordingly, the reactive motor 2, the switching stage 3, the comparison element 4, the interference-suppression and delay element 5, and the driving logic circuit 9 have not been numbered in more detail. Differences from the circuit according to FIG. 11, in the phase comparator 6, the self-starting stage 8, and in the linkage element 10 will be explained in detail below.

The phase comparator 6 contains two pulsed flip-flops D14, D15, whose pulsing inputs $C_k$ have impressed on them the second pulsing frequency $f_2$ of 4096 Hz. The input of the first pulsed flip-flop D14 has impressed on it the design-frequency $f_s$, for example 16 Hz. On the other hand, the noise-free actual-frequency signal $i_1$ is applied to the input of the second pulsed flip-flop D15. The outputs Q of the two pulsed flip-flops D14 and D15 lead to one input each of EXCLUSIVE OR-gates G39 and G40. The inputs of these gates have applied to them the desired frequency signal $f_s$ or respectively the noise-free actual-frequency signal $i_1$. The outputs of the two EXCLUSIVE OR-gates G39 and G40 are connected to one input each of a NAND-gate G41 or respectively G42 and through an inverter G43 or G44 to the other input of said NAND-gate G41 or respectively G42. The outputs of these two NAND-gates G41 and G42, together with the second pulsing frequency $f_2$, which is conducted over an inverter G45 and together with the switch-over signal $\beta$, is connected to the shift register comprising six J/K flip-flops J1–J6 as well as ten OR-gates G70–G79 as well as two other inverters G80 and G81. The setting-inputs S of the J/K flip-flops J1–J6 have applied to them the switch-over signal $\beta$, while the pulsing inputs $C_k$ of the flip-flops J1–J6 are connected to the inverted pulsing frequency $f_2$. The J-input of the first J/K flip-flop J1 is connected to the output of the inverter G81, and the J-inputs of the second through sixth J/K flip-flops J2–J6 are connected to the outputs of the OR-gates G70–G74. The K-inputs of the first five J/K flip-flops J1–J5 are connected to the outputs of the other OR-gates G75–G79, and the K-inputs of the sixth J/K flip-flop J6 is connected to the output of the other inverter G80. One input of the OR-gates G70–G74 which are connected to the J-inputs on their output side, and the input of the inverter G81 are connected to the output of the first NAND-gate G41. The inputs of the OR-gates G75 and G79, which are connected with the K-inputs, and the input of the other inverter G80 are connected with the output of the second NAND-gate G42. The other input of the OR-gate G70–G74, which is connected with the J-inputs of the J/K flip-flops, is connected to the negated output $\overline{Q}$ of the respectively preceding J/K flip-flops J1–J5. The other inputs of the OR-gates G75–G79, which are connected with the K-inputs of the J/K flip-flops J1–J5, are connected to the output Q of the respectively following J/K flip-flops J2–J6. At the outputs Q of the third, fourth, and fifth J/K flip-flops J3–J5, the appropriate braking or respectively accelerating pulses $Q_A$, $Q_B$, and $Q_C$ are connected to the linkage logic circuit 10, which is connected in series on the output side.

By means of the eight NAND-gates of the linkage logic 10, the output signals I, $\overline{I}$, as well as $Q_A$, $Q_B$, and $Q_C$ of the delay stage 522 or respectively of the phase comparator 6, as well as the negated switch-over signal $\overline{\beta}$, are connected with the output of the respectively preceding NAND-gate in the following fashion:

(a) Gate G52: Signal $\overline{I}$ and $Q_C$
(b) Gate G56: Signal $Q_B$ and I
(c) Gate G53: Output signal of the gate G52 and signal $Q_A$
(d) Gate G57: Output signal of the gate G56 and signal $Q_A$
(e) Gate G60: Switch-over signal $\beta$, signal $\overline{I}$ and signal $Q_C$
(f) Gate G54: Output signal of the gate G53 and switch-over signal $\overline{\beta}$
(g) Gate G61: Switch-over signal $\beta$, signal $Q_B$ and I
(h) Gate G58: Output signal of the gate G57 and switch-over signal $\overline{\beta}$ In this embodiment, besides the noise-free and delayed self-starting signal V—which is delivered by the interference-suppression and delay stage 51—only one other frequency signal, and specifically the pulsing signal of the waiting time element 7, is applied to the self-starting stage 8. The reset inputs of the two delay stages TR1 and TR2 of the waiting time element 7, and the T-flip-flops TR3–TR5 of the self-starting stage 8, are synchronously reset, in dependence on the noise-free and delayed self-starting signal V, which is likewise applied, and in dependence on the switch-over signal $\beta$, which is emitted by the self-starting stage 8.

The self-starting stage 8, in this embodiment, consists of three T-flip-flops TR3–TR5, whose inputs are connected with the output Q of the preceding flip-flop or respectively have applied to them the output signal of the waiting time element 7. Corresponding to the embodiment according to FIG. 11, the output of the last T-flip-flop TR5, together with the frequency signal, is applied to a NAND-gate, whose output signal, together with the output signal of the third T-flip-flop TR5, is applied to the input of the multivibrator stage, which consists of two NAND-gates, that are connected together in a well-known fashion. The switch-over signal $\beta$ or respectively the negated switch-over signal $\overline{\beta}$ is present at the output of this multivibrator stage. The reset signal for the T-flip-flops of the waiting time element 7 and of the self-starting stage 8 is generated analogously to the circuit of FIG. 11. In this embodiment, the outputs Q and $\overline{Q}$ of the two divider stages TR1 and TR2 of the waiting time element 7 are used to specify various frequency signals. Here, the inputted pulsing frequency of e.g. 1680 Hz is divided down to 8 Hz or respectively 4 Hz, and consequently the frequency signals $F_1$, $\overline{F}_1$ and $F_2$, $\overline{F}_2$ are specified.

The output signals of the self-starting stage 8 and the output signals of the linkage stage 10 are connected together in the driving logic circuit 9, which is connected in series on the output side, in such a fashion that they satisfy the following truth table for activating the switches S1–S8 of the switching element 3:

switched active and step down the inputted pulsing frequency, for example from 16 Hz (FIG. 14b) according to the graph in FIG. 14d, which shows the negated outputs of the T-flip-flops Tr1–Tr4 or respectively the output Q of the fifth T-flip-flop Tr5. As long as the output Q of the fifth T-flip-flop TR5 is in state L, a

| Driving Signals | | | | | | FET Switches | | | | | | | | Remarks |
|---|---|---|---|---|---|---|---|---|---|---|---|---|---|---|
| $\bar{\beta}$ | $Q_c$ | $Q_h$ | $Q_a$ | I | $\bar{I}$ | S1 | S2 | S3 | S4 | S5 | S6 | S7 | S8 | |
| H | L | L | H | X | X | OFF | OFF | OFF | OFF | OFF | OFF | OFF | OFF | 1 |
| H | L | L | L | X | X | | | OFF | OFF | | | ON | ON | 2 |
| H | L | L | H | X | X | | | OFF | OFF | | | OFF | OFF | 3 |
| H | L | H | H | H | L | | | ON | OFF | | | ON | OFF | 4 |
| H | L | H | H | L | H | | | OFF | OFF | | | OFF | OFF | 5 |
| H | H | H | H | H | L | | | ON | OFF | | | ON | OFF | 6 |
| H | H | H | H | L | H | OFF | OFF | OFF | ON | OFF | OFF | OFF | ON | 7 |
| L | L | L | H | X | X | OFF | OFF | OFF | OFF | OFF | OFF | OFF | OFF | 8 |
| L | L | L | L | H | L | OFF | ON | OFF | OFF | OFF | ON | OFF | OFF | 9 |
| L | L | L | H | L | H | OFF | OFF | OFF | ON | OFF | OFF | OFF | ON | 10 |
| L | L | H | H | H | L | ON | OFF | OFF | OFF | ON | OFF | OFF | OFF | 11 |
| L | H | H | H | L | H | OFF | OFF | ON | OFF | OFF | OFF | ON | OFF | 12 |
| L | H | H | H | H | L | OFF | ON | OFF | OFF | OFF | ON | OFF | OFF | 13 | wherein the following conditions are indicated:
1 no pulses on coil 22
2 coil 22 in short circuit on OV
3 no pulses on coil 22
4 + pulse on coil 22
5 no pulses on coil 22
6 + pulse on coil 22
7 − pulse on coil 22
8 no pulses on coil 22 or 23
9 + pulse on coil 23
10 − pulse on coil 22
11 − pulse on coil 23
12 + pulse on coil 22
13 + pulse on coil 23.

Figure 14:
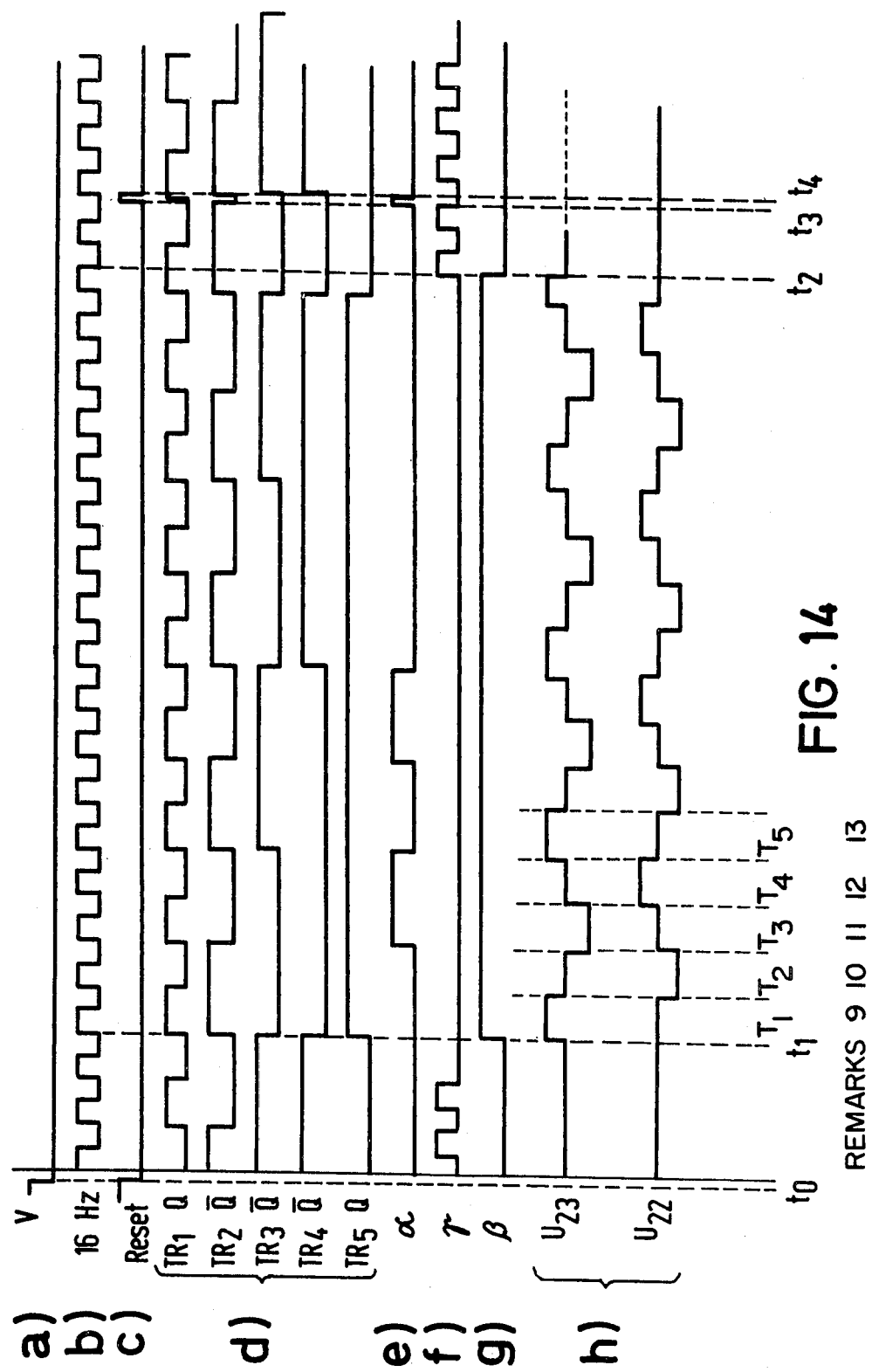

In connection with the time display of the signals according to FIG. 14, the mode of functioning of the arrangement according to FIG. 13 will be explained in more detail. In FIG. 14, from the top to the bottom, the following signals are shown:

(a) the self-starting signal V;
(b) the 16 Hz pulsing frequency for the waiting time element in the embodiment according to FIG 13, from which the frequency signal supplied to self-starting stage 8 is derived and therefore directly related to;
(c) the reset signal for resetting the T-flip-flops of the self-starting stage of the waiting time element;
(d) the output signals of the T-flip-flops of the self-starting stage and of the waiting time element;
(e) the output signal α of the waiting time element;
(f) the output signal γ of the NAND-element G90;
(g) the switch-over signal β; and
(h) the voltage at the coils 22 and 23 of the reactive motor 2.

If the rotational speed of the rotor 21 of the motor 2 falls below a certain limit, so that the output signal V no longer reaches a high potential for a certain time interval, the common reset input R of the T-flip-flops TR1–TR5 of the waiting time element 7 and of the self-starting stage 8 remain at low potential during this time interval. It is here presupposed that the switch-over signal β was in the state of low potential during the preceding regulation operation, and that at least one of the two output signals α or the negated output signal of the second T-flip-flop of the self-starting stage 8 was in the state of high potential. During the total time range under consideration here, the output signal V is in the state of low potential, for example, because the rotor 21 of the motor 2 is no longer moving. With the dropping of self-starting signal V, the reset signal also vanishes at time $t_o$ (FIG. 14c). Thus the T-flip-flops TR1–TR5 are singal γ, corresponding to the pulsing frequency, appears at the output of the gate G90. If the self-starting signal V remains in the state L during a certain time interval, the flip-flop G91 is set, so that the switch-over signal β is set into the state H at time $t_1$, and the negated switch-over signal $\bar{\beta}$ is set into the state L. After the switch-over signal β has been set into the state H, and as long as the switch-over signal β remains in this state, resetting of the T-flip-flops TR1–TR5 is prevented, since the reset signal for the five T-flip-flops TR1–TR5 remains in the state L because β=H. As long as the switch-over signal β remains in the state H, self-starting operation will continue according to the principle of a stepping motor with two coils. During this time, the two coils 22 and 23 of the reactive motor 2 have applied to them the frequency signals according to FIG. 14h, which are composed, by means of the driving logic circuit, from the frequencies that are emitted from the first and second T-flip-flops TR1 and TR2 at their outputs Q or respectively negated outputs $\bar{Q}$. This is done in such a fashion that the switching table for switches S1–S8 is fulfilled as specified above. During the high range from time $t_1$–$t_2$, this switching logic for the switches S1–S8 results in the pulse train for the coils 22 and 23 which is shown in FIG. 14h.

If the output signal Q of the fifth T-flip-flop TR5 is set into the stage L, the flip-flop G91 is set to L with the switch-over signal β and is set to H with the negated switch-over signal $\bar{\beta}$, after another cycle of the inputted frequency signal, for example a 16 Hz signal, has elapsed. At time $t_2$, this implies a change of the previous self-starting operation into normal regulation operation. The results of this type of pulse linkage is that the last self-starting pulse has half the width, corresponding to the inputted pulsing frequency, of the preceding self-starting pulses. At time T$_3$, a signal according to FIG. 14e is emitted by the second T-flip-flop TR2 at a negated output. This signal leads to the reset pulse according to 14c, whose falling edge occurs at time t$_4$. This terminates self-starting operation. In the subsequent normal regulation operation, the second coil 23 of the reactive motor 2 serves as a control coil or as a pickup coil, whose output signal leads to the signals V and I, as described above.

While an embodiment and application of this invention has been shown and described, it will be apparent to those skilled in the art that many more modifications will be possible without departing from the inventive concept herein described.

What is claimed and desired to be secured by Letters Patent of the United States:

1. A control circuit for driving a reactive motor at a substantially constant desired rotational speed and for accelerating said motor after a stoppage thereof, said motor including a rotor having at least one pair of permanent magnetic poles and a stator which is provided with first and second coils, wherein said first coil acts only as a driving coil, and wherein said second coil acts, in a normal speed mode of said control circuit, as sensing means for detecting the rotational speed of said rotor and, in a self-starting mode of said control circuit, as an additional driving coil to said first coil, said control circuit comprising:
   (a) voltage supply terminals;
   (b) oscillator and divider means for generating a plurality of timing pulse frequencies including a timing pulse frequency corresponding to said desired rotational speed of said rotor;
   (c) normal speed regulating means for generating normal speed pulses depending upon a comparison between output pulses which are provided by said second coil as actual frequency pulses corresponding to the actual rotational speed of said rotor in said normal speed mode and said timing pulse frequency corresponding to said desired rotational speed of said rotor;
   (d) self-starting pulse generating means connected to said oscillator and divider means for generating self-starting pulses at an initial self-starting frequency which is lower than the frequency corresponding to driving of said rotor at said desired rotational speed, and thereafter at increasing frequencies until said rotor attains said desired rotational speed;
   (e) mode-switching means for receiving said detected speed of said rotor and for initiating switch-over from said normal speed mode to said self-starting mode dependent upon said detected rotor speed;
   (f) control logic means for receiving said normal speed pulses and said self-starting pulses and for generating therefrom switching signals which are provided as energizing pulses to said first coil only in the normal speed mode and alternately to said first and second coils in the self-starting mode; and
   (g) a switching circuit electrically interposed between said voltage supply terminals and said first and second coils and having a plurality of electrically operated switches for receiving said switching signals and, in response thereto, electrically connecting said first or second coil to one of said voltage supply terminals.

2. A control circuit according to claim 1, wherein said mode-switching means includes comparator and digitizing means for:
   (a) receiving an induced voltage sensor signal from said second coil, comparing said sensor signal to a first reference voltage, and generating from said comparison a stream of digitized actual-value frequency pulses, (I, Ī) the width of said actual-value frequency pulses corresponding to the time periods during which said sensor signal voltage exceeds said first reference voltage; and
   (b) comparing said sensor signal voltage to a second reference voltage and generating from said comparison a stream of digitized threshold speed monitoring signals (V), the width of said threshold speed monitoring signals corresponding to the time periods during which said sensor signal voltage exceeds said second reference voltage.

3. A control circuit according to claim 2, further comprising desired value frequency pulse generating means for generating a stream of desired value frequency pulses (f$_2$, f̄$_2$) and wherein said desired value frequency pulses and said actual-value frequency pulses are supplied to said normal speed pulse regulating means (6) which includes means for correlating said desired value and actual-value frequency pulses to produce said normal speed pulses, and wherein said threshold speed monitoring signals and one of said plurality of timing pulse frequencies are supplied to said self-starting pulse generating means (8) which includes means for generating a switch-over signal (β) and initiating generation of said self-starting pulses whenever the frequency of said threshold speed monitoring pulses drops below a predetermined value.

4. A control circuit as in claim 3, wherein said normal speed pulses produced by said normal-speed pulse regulating means comprise first and second normal speed pulse trains (H$_o$−, H$_o$+), said first normal speed pulses (H$_o$−) having a rising edge which coincides with the falling edge of said desired value frequency pulses (f$_2$) and a falling edge which coincides with the rising edge of said actual-value frequency pulses (I), said second normal speed pulses (H$_o$+) having a rising edge which corresponds with the rising edge of said desired value frequency pulses (f$_2$) and a falling edge which corresponds with the falling edge of said actual-value frequency pulses (I), and wherein said first and second normal speed pulse trains, said self-starting pulses and said switch-over signal are supplied to said switching circuit (9) to thereby cause said switching circuit, in said normal speed mode, to alternately connect the terminals of said first coil (22) with said voltage supply terminals.

5. A control circuit as in claim 3, further comprising means for causing said control means to reinitiate said self-starting mode if said rotor does not attain said desired speed following a prior progression through said self-starting mode.

6. A control circuit for driving an electric motor at a substantially constant desired rotational speed and for accelerating said motor up to said desired speed after a stoppage thereof or the application of an adverse resistive torque thereto, said motor including a rotor having at least one pair of permanent magnetic poles and a stator provided with first and second coils, said control circuit comprising:
   (a) detection means for detecting the rotational speed of said rotor and for generating a sensor signal (U(n)) the voltage of which is proportional to said rotor speed;
(b) mode-switching means for switching said control circuit between a normal-speed mode and a self-starting mode dependent upon the detected speed of said rotor, said mode-switching means comprising:
  (1) a comparison element (4) having a first input for receiving said sensor signal, second and third inputs for receiving, respectively, first and second reference voltages (Ur, Us), and first and second outputs for generating, respectively, first and second comparison signals (v, i); and
  (2) an interference and delay stage (5) having first and second inputs for receiving, respectively, said first and second comparison signals, and further having first and second outputs for generating, respectively, first and second delay versions (I, $\bar{I}$ and V) of said comparison signals;
(c) oscillator and divider means for generating a plurality of electrical timing pulse frequencies;
(d) normal speed pulse generating means (6) having a first input for receiving said first delayed comparison signal (I, $\bar{I}$), a second input for receiving desired-value frequency pulses, and first and second outputs for generating therefrom normal-speed running pulses (Ho−, Ho+);
(e) a self-starting stage (8) having a first input for receiving said second delayed comparison signal (V), a second input for receiving at least one of said plurality of timing pulse frequencies, a third input for receiving a waiting time elapsed signal (N), a first output for generating said desired-value frequency pulses ($f_2$, $\bar{f_2}$) and a second output for generating a switch-over initiation signal ($\beta$, $\bar{\beta}$);
(f) a waiting time element (7) having a first input for receiving said second delayed comparison signal (V), a second input for receiving said switch-over initiation signal, a third input for receiving one of said plurality of timing pulses, and a first output for generating said waiting time elapsed signal (N);
(g) control logic means (9) having first and second inputs for receiving, respectively, said first and second normal-speed running pulses (Ho−, Ho+) a third input for receiving said switch-over signal, a fourth input for receiving said desired-value frequency pulses, and an output for generating therefrom a switching signal pulse train ($T_n$);
(h) positive and negative voltage supply terminals ($\pm U_B$); and
(i) a switching circuit (3) having a first input for receiving said switching signal pulse train ($T_n$) and second and third inputs for receiving said positive and negative voltage supply terminals, said switching circuit including means for selectively connecting said coils to said voltage terminals dependent upon said switching signal pulse train.

7. A control circuit according to claim 6 wherein said detection means comprises said first coil (23), and wherein said comparison element comprises:
(a) a first comparator (41), having a positive input connected to said first coil and a negative input connected to a first reference voltage source; and
(b) a second comparator (42), having a positive input connected to said first coil and a negative input connected to a second reference voltage source.

8. A control circuit as in claim 7, wherein said interference supression and delay stage comprises:

a first interference supression delay component (51) having an input connected to an output of said first comparator and an output connected to an input of said self-starting stage (8) for supplying said second delayed comparison signal (V) thereto; and
a second interference supression and delay component (52) having an input connected to an output of said second comparator and an output connected to an input of said normal-speed pulse generating means for supplying said first delayed comparison signal (I, $\bar{I}$) thereto.

9. A control circuit according to claim 8, wherein each of said first and second interference supression and delay components comprises:
(a) a delay line of a plurality of pulsed flip-flops ($D_1$–$D_4$ and $D_5$–$D_8$) each having a pulsing input ($C_k$) supplied with one of said plurality of timing pulses ($f_4$) a data input, a positive output (Q) and a negated output ($\bar{Q}$), said plurality of flip-flops including a first flip-flop ($D_1$ and $D_5$) the data input of which is connected to the output of said comparator (41 and 42) and a last flip-flop ($D_4$ and $D_8$), the remainder of said flip-flops being series-connected in that positive output (Q) of each of said remainder flip-flops is connected to the data input of a subsequent remainder flip-flop;
(b) a first NAND-gate (G1 and G5) having a first input connected to said positive output of said first flip-flop ($D_1$ and $D_5$), a second input connected to said positive output of said last flip-flop ($D_5$ and $D_8$) and an output;
(c) a second NAND-gate (G2 and G6) having a first input connected to said negated output of said first flip-flop ($D_1$ and $D_5$), a second input connected to said negated output of said last flip-flop ($D_5$ and $D_8$) and an output;
(d) a third NAND-gate (G3 and G7) having a first input connected to said output of first NAND-gate (G1 and G5), a second input and an output (V and I);
(e) a fourth NAND-gate (G4 and G8) having a first input connected to said output of said second NAND-gate (G2 and G6), a second input and an output ($\bar{V}$ and $\bar{I}$);
(f) the output of said third NAND-gate (G3 and G7) being connected to said second input of said fourth NAND-gate (G4 and G8) and the output of said fourth NAND-gate (G4 and G8) being connected to said second input of said third NAND-gate (G3 and G7); and wherein
(g) said output of said third NAND-gate (G3) of said first interference supression and delay element (51) is connected to said first input of said self-starting stage (8) for supplying said second delayed comparison signal (V) thereto; and
(h) said outputs of said third NAND-gate (G7) and said fourth NAND-gate (G8) of said second interference supression and delay element (52) are connected to said first input of said normal-speed pulse generating means for supplying said first delayed comparison signals (I and $\bar{I}$) thereto.

10. A control circuit according to claim 6, wherein said normal-speed pulse generating means (6) comprises first and second normal speed pulse generating stages (61 and 62), each including:
(a) a first D-flip-flop ($D_{R1}$ and $D_{R3}$) having a first input connected to a positive voltage supply, a second pulsing input ($C_k$) connected to said first output of said self-starting stage (8) and supplied with said desired-value frequency pulses ($f_2$ and $f_2$) therefrom, a reset input (R) and a negated output ($\overline{Q}$);

(b) a second D-flip-flop ($D_{R2}$ and $D_{R4}$) having a first input connected to a positive voltage supply, a second pulsing input ($C_k$) connected to said interference supression and delay stage (5) for receiving therefrom said first delayed comparison signals (I and $\overline{I}$), a reset input (R), a positive output (Q) and a negated output ($\overline{Q}$);

(c) a first NOR-gate (G12 and G14) having a first input connected to said negated output ($\overline{Q}$) of said first D-flip-flop ($D_{R1}$ and $D_{R3}$), a second input connected to said negated output ($\overline{Q}$) of said second D-flip-flop ($D_{R2}$ and $D_{R4}$) and an output connected to said reset input (R) of said first D-flip-flop ($D_{R1}$ and $D_{R3}$) and to said reset input (R) of said second D-flip-flop ($D_{R2}$ and $D_{R4}$); and (d) a second NOR-gate (G13 and G15) having a first input connected to said interference supression and delay stage (5) for receiving therefrom said first delayed comparison signals (I and $\overline{I}$), a second input connected to said negated output ($\overline{Q}$) of said first D-flip-flop ($D_{R1}$ and $D_{R3}$), a third input connected to said positive output (Q) of said second D-flip-flop ($D_{R2}$ and $D_{R4}$) and an output connected to said control logic means for supplying said normal-speed running pulses ($Ho^-$ and $Ho^+$) thereto.

11. A control circuit as in claim 6, wherein said self-starting stage (8) comprises:

(a) a delay line which includes a series circuit of at least a first, a second and a third T-flip-flop ($T_{R4}$, $T_{R5}$ and $T_{R6}$), each having a pulsed input, a reset input (R) and a negated output ($\overline{Q}$), said pulsed input of said first T-flip-flop ($T_{R4}$) being connected to said waiting time element (7) and supplied with said waiting time elapsed signal (N) therefrom, and said negated outputs of said second and third T-flip-flops ($T_{R4}$ and $T_{R5}$) being connected to said pulsed input of a subsequent T-flip-flop (TR5 and TR6);

(b) a first gate circuit including:
 (1) a first NOR-gate (G9) haing a first input connected to said negated output ($\overline{Q}$) of said third T-flip-flop ($T_{R6}$), a second input connected to said output of said waiting time element (7) and supplied with said waiting time elapsed signal (N) therefrom, and an output;
 (2) a second NOR-gate (G10) having a first input connected to said output of said first NOR-gate (G9), a second input connected to said interference supression and delay stage (5) and supplied with said second delayed comparison signal (V) therefrom and an output; and
 (3) a third NOR-gate (G11) having a first input connected to said output of said second NOR-gate (G10), a second input supplied with said switch-over signal ($\beta$), and an output connected to each of said reset inputs (R) of said first, second and third T-flip-flops ($T_{R4}$, $T_{R5}$ and $T_{R6}$);

(c) a second gate circuit having:
 (1) a first AND-gate (G30) having a first input supplied with said negated switch-over signal ($\overline{\beta}$), a second input supplied with a first of said timing pulse frequencies ($f_{03z}$), and an output;
 (2) a second AND-gate (G31) having a first input supplied with said switch-over signal ($\beta$), a second input supplied with said negated output ($\overline{Q}$ or P) from said first T-flip-flip ($T_{R4}$), a third input supplied with said negated output ($\overline{Q}$ or R) from said second T-flip-flop ($T_{R5}$), a fourth input supplied with a second of said timing pulse frequencies ($f_{01z}$) and an output;
 (3) a third AND-gate (G32) having a first input supplied with said switch-over signal ($\beta$), a second input supplied with a negated version ($\overline{P}$) of said output from said first T-flip-flop ($T_{R4}$), a third input supplied with said negated output ($\overline{Q}$ or R) from said second T-flip-flop ($T_{R5}$), a fourth input supplied with a third of said timing pulse frequencies ($f_{02z}$), and an output; and
 (4) a fourth AND-gate (G33) having a first input supplied with said switch-over signal ($\beta$), a second input supplied with a negated version ($\overline{R}$) of said output signal ($\overline{Q}$ or R) from said second T-flip-flop ($T_{R5}$), a third input supplied with said first timing pulse frequency ($f_{03z}$), and an output;

(d) a NOR-gate (G34) having first through fourth inputs supplied with said outputs of said first through fourth AND-gates (G30 to G33) and an output for supplying a pulse train ($f_o$);

(e) a frequency step-down stage (82 and 83) having an input for receiving said pulse train ($f_o$);

(f) an additional NOR-gate (36) having a first input supplied with negated version ($\overline{S}$) of said output ($\overline{Q}$ or S) from said third T-flip-flop ($T_{R5}$), a second input supplied with said waiting time elapsed signal (N), and an output; and (g) an additional flip-flop (81) having a first input supplied with a negated version ($\overline{S}$) of said output ($\overline{Q}$ or S) from said third T-flip-flop ($T_{R5}$), a second input supplied with said output from said additional NOR-gate (36), a first output for supplying said switch-over signal ($\beta$), and a second output for supplying a negated version ($\overline{\beta}$) of said switch-over signal ($\beta$).

12. The apparatus of claim 6 wherein said switching circuit (3) includes switches $S_1$–$S_8$ and wherein said output signals of said self-starting stage (8) and of said normal-speed pulse generating means (6) are linked together in said control logic means (9) such that they satisfy the following truth table, and such that they lead to the following switching conditions of said switches (S 1–S 8) of said switching circuit (3), where said switches are activated by said switching signal pulse train (Tn).

|  | Signals | | | | | | | Switches | | | |
|---|---|---|---|---|---|---|---|---|---|---|---|
| Mode | $\beta$ | $T_5$ | $T_6$ | $T_7$ | $T_8$ | $H\overset{+}{o}$ | $H\overset{-}{o}$ | S1/S5 | S2/S6 | S3/S7 | S4/S8 |
| Self | H | H | L | L | L | — | — | E | A | A | A |
| starting | H | L | L | L | H | — | — | A | A | A | E |
| mode | H | L | H | L | L | — | — | A | E | A | A |
|  | H | L | L | H | L | — | — | A | A | E | A |
| Normal | L | L | L | H | L | H | L | A | A | E | A |

-continued

| | Signals | | | | | | | Switches | | | |
|---|---|---|---|---|---|---|---|---|---|---|---|
| Mode | β | $T_5$ | $T_6$ | $T_7$ | $T_8$ | $H_o^+$ | $H_o^-$ | S1/S5 | S2/S6 | S3/S7 | S4/S8 |
| speed mode $H_o^+$ | | | | | | | | | | | |
| Normal | L | L | L | L | H | L | H | A | A | A | E |
| speed mode $H_o^-$ | | | | | | | | | | | |
| $H_o^+ = H_o^-$ | L | L | L | L | L | L | L | A | A | A | A | wherein
H = high potential
L = low potential
— = state not significant
E = switch closed
A = switch open.

* * * * *